(12) United States Patent
Qui

(10) Patent No.: US 6,979,084 B2
(45) Date of Patent: Dec. 27, 2005

(54) METHOD FOR EVALUATING BINOCULAR PERFORMANCE OF SPECTACLE LENSES, METHOD FOR DISPLAYING BINOCULAR PERFORMANCE, AND APPARATUS THEREFORE

(75) Inventor: Hua Qui, Tokyo (JP)

(73) Assignee: Hoya Corporation, Tokyo (JP)

( * ) Notice: Subject to any disclaimer, the term of this patent is extended or adjusted under 35 U.S.C. 154(b) by 485 days.

(21) Appl. No.: 10/235,921

(22) Filed: Sep. 6, 2002

(65) Prior Publication Data
US 2003/0076479 A1 Apr. 24, 2003

(30) Foreign Application Priority Data
Sep. 6, 2001 (JP) ........................................ 2001-270267

(51) Int. Cl.[7] .............................. A61B 3/00; G06T 17/00
(52) U.S. Cl. ......................... 351/246; 345/428; 345/629
(58) Field of Search ................................ 345/428–430, 345/581, 589, 592, 611, 619, 629, 630, 632–634, 647, 139, 150–152; 359/407, 480, 618, 364, 725, 462; 351/200, 205, 221, 224, 237, 246, 41, 176, 159; 128/898

(56) References Cited

U.S. PATENT DOCUMENTS

| 4,310,225 | A | * | 1/1982 | Davis ......................... 351/176 |
| 5,796,523 | A | * | 8/1998 | Hall ............................ 359/629 |
| 6,329,989 | B1 | | 12/2001 | Qi et al. |
| 6,517,201 | B2 | * | 2/2003 | Qi ............................... 351/41 |

| 2001/0024231 | A1 | * | 9/2001 | Nakamura et al. ............. 348/58 |
| 2003/0202154 | A1 | * | 10/2003 | Welk et al. .................. 351/159 |

FOREIGN PATENT DOCUMENTS

| EP | 0 734 683 A1 | 10/1996 |
| EP | 0 950 887 A2 | 10/1999 |
| EP | 1 018 691 A1 | 7/2000 |
| EP | 1 146 328 A2 | 10/2001 |
| EP | 1 158 338 A2 | 11/2001 |

OTHER PUBLICATIONS

Debesset, S., European Search Report, Nov. 21, 2003, 3 pages.

* cited by examiner

*Primary Examiner*—Brian L. Casler
*Assistant Examiner*—John R Sanders
(74) *Attorney, Agent, or Firm*—Griffin & Szipl, P.C.

(57) ABSTRACT

To enable evaluation of the binocular performance of spectacle lenses and display of the result of the evaluation, a method and an apparatus for evaluating and indicating the binocular performance of spectacle lenses. Binocular performance indexes indicating the binocular performance of the spectacle lenses to an object point within a visual field when it is observed through specific positions on both lenses are defined. For all object points in the visual field, the binocular performance indexes are derived. An image of the visual field, in which each pixel is assigned a monochromatic luminosity or a set of primary RGB color luminosity according to the value of the binocular performance index for viewing the corresponding object point, is created and displayed.

22 Claims, 21 Drawing Sheets

(10 of 21 Drawing Sheet(s) Filed in Color)

Flow for creating binocular performance index image

Processes within ⌐ ⌐ is down for each image pixel

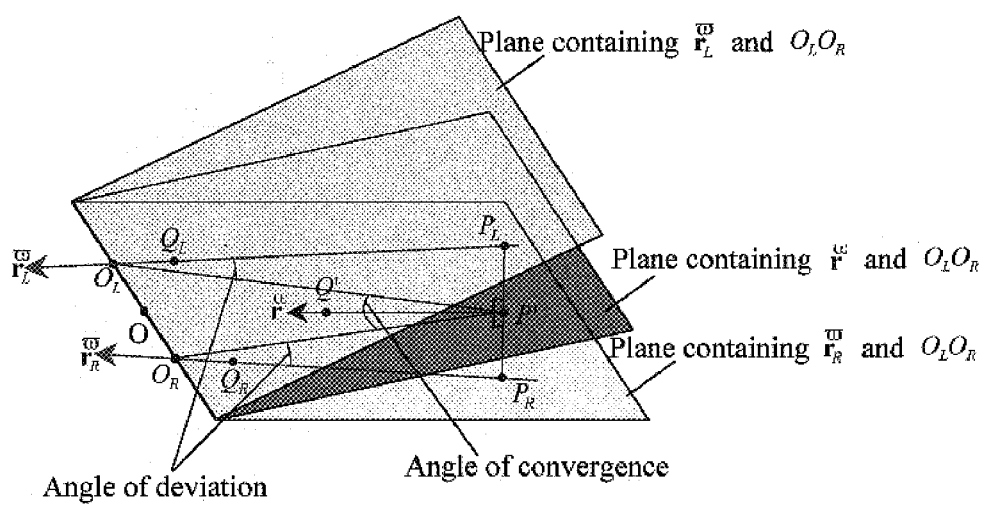
Angle of convergence = angle AOB
Angle of vertical deviation = angle COD
Fig.5

Optical Parameters of Navarro's Eye Model (Accommodation Free)

| Radius of Curvature (mm) | |
|---|---|
| Anterior surface of cornea | 7.72 |
| Posterior surface of cornea | 6.2 |
| Anterior surface of crystalline lens | 10.2 |
| Posterior surface of crystalline lens | -6.0 |
| Asphericity Q | |
| Anterior surface of cornea | -0.26 |
| Anterior surface of crystalline lens | -3.1316 |
| Posterior surface of crystalline lens | -1.0 |
| Thickness (mm) | |
| Cornea | 0.55 |
| Aqueous | 3.05 |
| Crystalline lens | 4.0 |
| Vitreous | 16.4 |
| Refractive index | |
| Cornea | 1.367 |
| Aqueous | 1.3374 |
| Crystalline lens | 1.42 |
| Vitreous | 1.336 |
| Resulting refractive power (diopters) | 60.4 |

Fig. 7

Dependence of Lens Parameters on Accommodation A (in diopters)

| Lens Parameter | Accommodation depence |
|---|---|
| Anterior Crystalline Lens Radius | $R_3(A) = 10.2000 - 1.7500 \ln(A+1)$ |
| Anterior Crystalline Lens Asphericity | $Q_3(A) = -3.1316 + 0.3400 \ln(A+1)$ |
| Posterior Crystalline Lens Radius | $R_4(A) = -6.0000 + 0.2294 \ln(A+1)$ |
| Posterior Crystalline Lens Asphericity | $Q_4(A) = -1.0000 - 0.1230 \ln(A+1)$ |
| Aqueous Thickness | $D_2(A) = 3.0500 - 0.0500 \ln(A+1)$ |
| Crystalline Lens Thickness | $D_3(A) = 4.0000 + 0.1000 \ln(A+1)$ |
| Crystalline Lens Refractive Index | $n_3(A) = 1.4200 + 9.00 \times 10^{-5}(10.00A + A^2)$ |

Fig. 8

Original image of the visual field positions on the convex surface of lenses
where the visual lines pass Fig.15 residual power of the average of the right and the left residual wavefront Convergence-accommodation difference Binocular vertical deviation Binocular point deformation index Binocular clearness index

METHOD FOR EVALUATING BINOCULAR PERFORMANCE OF SPECTACLE LENSES, METHOD FOR DISPLAYING BINOCULAR PERFORMANCE, AND APPARATUS THEREFORE

CROSS-REFERENCE TO RELATED APPLICATIONS

This application claims priority from Japanese Patent Application No. 2001-270267, filed Sep. 6, 2001.

1. Field of the Invention

The present invention relates to a method and apparatus for indicating binocular performance of spectacle lenses in a directly appreciable way.

2. Background of the Invention

Known methods for displaying performance of a spectacle lens include such methods as deriving the average refractive power and the astigmatism value of the surface of the lens and indicating the distribution of these parameters by contour lines on the lens surface.

However, the average refractive power and the astigmatism value of the surface of the lens normally indicate only the property of lens surface curvature and they are not able to directly indicate the performance of the lens for observing the outside world as seen through the lens. Therefore, the inventor has devised an ocular optical system simulating method for simulating how objects can actually be observed in the outside 3-dimensional world as seen through a spectacle lens. This method of evaluating the performance of the lens for visually observing the outside world through the lens takes into consideration the visual acuity of a person wearing the lensed spectacle. This method is a method of creating and using a rotation-based retinal image instead of an optical image projected to the retinal surface of the eyes. The rotation-based retinal image is defined as the image obtained by turning (i.e., rotating) the eye-ball with respect to all object points within a visual field to generate a number of images and by connecting these images caught at the fovea. The rotation-based retinal image approximates an image perceived by the eyes as seen through the spectacle lens.

The rotation-based retinal image and its motion video image can model or represent optical fluctuation, distortion and blur, which can be perceived when viewing the outside world through the spectacle lens. This method is described, for example, in U.S. patent application Ser. No. 09/415,498 filed Oct. 12, 1999, which is incorporated herein by reference in its entirety. However, the rotation-based retinal image does not directly indicate image performance; rather, the rotation-based retinal image is a resultant image whereby the lens imaging performance is reflected by the image when viewing each physical point within the image. For instance, the rotation-based retinal image provides the same resultant image even if the point spread function ("PSF") is different at a part of the image where changes in brightness are small. Therefore, the rotation-based retinal image is unable to perfectly reflect a PSF whose extension is small such as in the case of an original image having a smaller number of pixels.

In order to solve the problem described above, the inventor has devised a method for evaluating and/or indicating spectacle lens performance for observing the outside world visually through the lens and displaying the performance indexes in a directly appreciable way. The performance indexes evaluated include not only clearness index, but also average power error, residual astigmatism, deformation index, etc.

However, both the rotation-based retinal image (abbreviated as "RRI") and the performance index image are based on monocular vision. It is not sufficient to evaluate the visual performance of a lens using only monocular properties because humans usually see with two eyes (i.e., binocular vision).

The inventor has devised a method for simulating what an observer sees binocularly through two spectacle lenses, each lens being placed in front of a respective one of the right and left eyes. The resultant image is called a "binocular synkinetic rotation-based retinal image."

Just like the monocular rotation-based retinal image, the binocular synkinetic rotation-based retinal image also has the problem that it does not directly evaluate or indicate visual performance.

The present invention has an object of providing a method for evaluating the binocular performance of spectacle lenses. The present invention endeavors to provide more than just a simple analogy derived from monocular vision and applied to binocular vision. The present invention endeavors to take into consideration and evaluate many factors that only affect visual performance of a lens when the observer sees with two eyes.

SUMMARY OF THE INVENTION

The present invention provides both a method and an apparatus for evaluating and/or indicating binocular performance of spectacle lenses when a visual field is seen by an observer through right and left spectacle lenses. In a first preferred method embodiment in accordance with the present invention, a method for indicating binocular performance of spectacle lenses when a visual field is seen by an observer through right and left spectacle lenses is characterized by the steps of: (1) defining a binocular performance index expressing a binocular performance of the spectacle lenses for viewing an object point in a visual field to obtain a binocular performance index definition; (2) deriving a binocular performance index for each of a plurality of object points distributed over the visual field using the binocular performance index definition: and (3) displaying the scale of the obtained binocular performance indexes in a visually understandable mode.

In a second preferred method embodiment in accordance with the present invention, a method for indicating binocular performance of spectacle lenses when a visual field is seen by an observer through right and left spectacle lenses characterized by the steps of: (1) defining a binocular performance index expressing a binocular performance of the spectacle lenses for viewing an object point in a visual field to obtain a binocular performance index definition; (2) deriving a binocular performance index for all object points in the visual field using the binocular performance index definition, each object point having a binocular performance index and corresponding to a pixel of an image which covers the visual field; and (3) creating a binocular performance index image covering the visual field, wherein a monochromatic or RGB color luminosity of each pixel is assigned to indicate a value of the binocular performance index for viewing the corresponding object point.

In accordance with a first preferred apparatus embodiment of the present invention, an apparatus for indicating binocular performance of spectacle lenses when an observer sees through right and left spectacle lenses, is characterized by:

(a) means for creating an original image, further comprising: (i) means for creating virtual objects by using computer graphics and placing the virtual objects in a virtual three-dimensional space; (ii) means for placing a midpoint of binocular rotation at a specific position in the virtual three-dimensional space; (iii) means for creating an original image of the virtual objects within a visual field, the visual field defined as a pyramid having an apex located at the midpoint of binocular rotation and a central axis oriented along a direction of a specific central visual line; and (iv) means for deriving, with respect to a plurality of object points, each object point corresponding to a pixel of the original image, an object distance, wherein the object distance is defined as a distance between the object point and the midpoint of binocular rotation; (b) means for creating a distorted original image, further comprising: (i) means for defining a direction of synkinetic binocular rotation for viewing an object point, wherein the synkinetic binocular rotation is uniquely determined by both directions of monocular rotation for right and left eyeballs directed toward the object point; (ii) means for deriving a central direction of synkinetic binocular rotation with a ray tracing method so that each of right and left monocular central principal rays pass through a specific position on each spectacle lens, respectively, wherein the central direction of synkinetic binocular rotation is the direction of synkinetic binocular rotation for viewing the object point located at a center of the visual field and the right and left monocular central principal rays are principal rays directed from the right and left eyeballs, respectively, toward the central object point; (iii) means for deriving, with respect to each object point, a direction of synkinetic binocular rotation for viewing the object point as a position of the object point in an after-lens visual field with a ray tracing method, wherein the after-lens visual field is a visual field that has a central axis oriented along the central direction of synkinetic binocular rotation; (iv) means for creating a distorted original image, the distorted original image being defined as an image obtained in the after-lens visual field and having distortion caused by the spectacle lenses; and (v) means for deriving, with respect to each object point, both right and left principal ray-passing positions, wherein each principal ray-passing position is a position on the respective spectacle lens through which a principal ray directed toward the object point passes; (c) means for deriving positions of spectacle frames by creating images of spectacle frame marks that indicate positions of right and left spectacle frames on the original image, or on the distorted original image, by using data of the principal ray-passing positions determined when creating a distorted original image; (d) means for deriving a binocular performance index, further comprising: (i) means for providing an accommodation-dependent ocular optical system for each of the right and left eyes as a model of the ocular optical system; (ii) means for calculating, with respect to each object point corresponding to a pixel of the original image or the distorted original image, distances from the object point to the right and left centers of monocular rotation using the object distance obtained when creating an original image; (iii) means for setting, with respect to each object point corresponding to a pixel of the original image or the distorted original image, powers of accommodation of right and left eyes to a same value or to different values in accordance with each distance from the object point to each center of monocular rotation, and each refractive power of spectacle lens at each principal ray-passing position determined when creating a distorted original image; and (iv) means for deriving, with respect to each object point corresponding to a pixel of the original image or the distorted original image, a binocular performance index of spectacle lenses in a combined optical system comprising the spectacle lens and the accommodation-dependent ocular optical system which is rotated in accordance with a direction of monocular rotation; and (e) means for creating a binocular performance index image, further comprising: (i) means for creating the binocular performance index image by assigning, to each pixel of the original image or the distorted original image, a monocular luminance or luminances of three primary colors of RGB determined in accordance with a value of the binocular performance index of spectacle lenses, and (ii) means for overlaying the binocular performance index image with the frame mark images of spectacle frames created when deriving positions of spectacle frames.

The advantages of the present invention are summarized as follows. As described above in detail herein, a binocular performance index of spectacle lenses, which expresses the binocular performance of spectacle lenses when each object point in the visual field is seen by an observer, is defined and derived. The binocular performance of the spectacle lenses is evaluated using the derived binocular performance index and the result of the evaluation is displayed. Due to the evaluation and the display, the binocular performance of spectacle lenses can be evaluated and displayed in a condition very close to the actual use of the spectacle lenses.

BRIEF DESCRIPTION OF THE DRAWINGS

The patent or application file contains at least one drawing executed in color. Copies of this patent, patent application or patent application publication with color drawings will be provided by the office upon request and payment of the necessary fee.

FIG. 5 is a diagram describing the definition of the angle of convergence and the angle of binocular vertical deviation.

FIG. 7 is a diagram showing ocular optical parameters (un-accommodated) of the Navarro Eye model.

FIG. 8 shows equations describing the dependency of the ocular optical lens parameters of the Navarro Eye model on the power of accommodation.

DETAILED DESCRIPTION OF THE PREFERRED EMBODIMENTS

The preferred method and apparatus embodiments in accordance with the present invention will now be described. To facilitate an easy understanding of the preferred embodiments, the method embodiments will be described first.

A Embodiment 1

Figure 1:
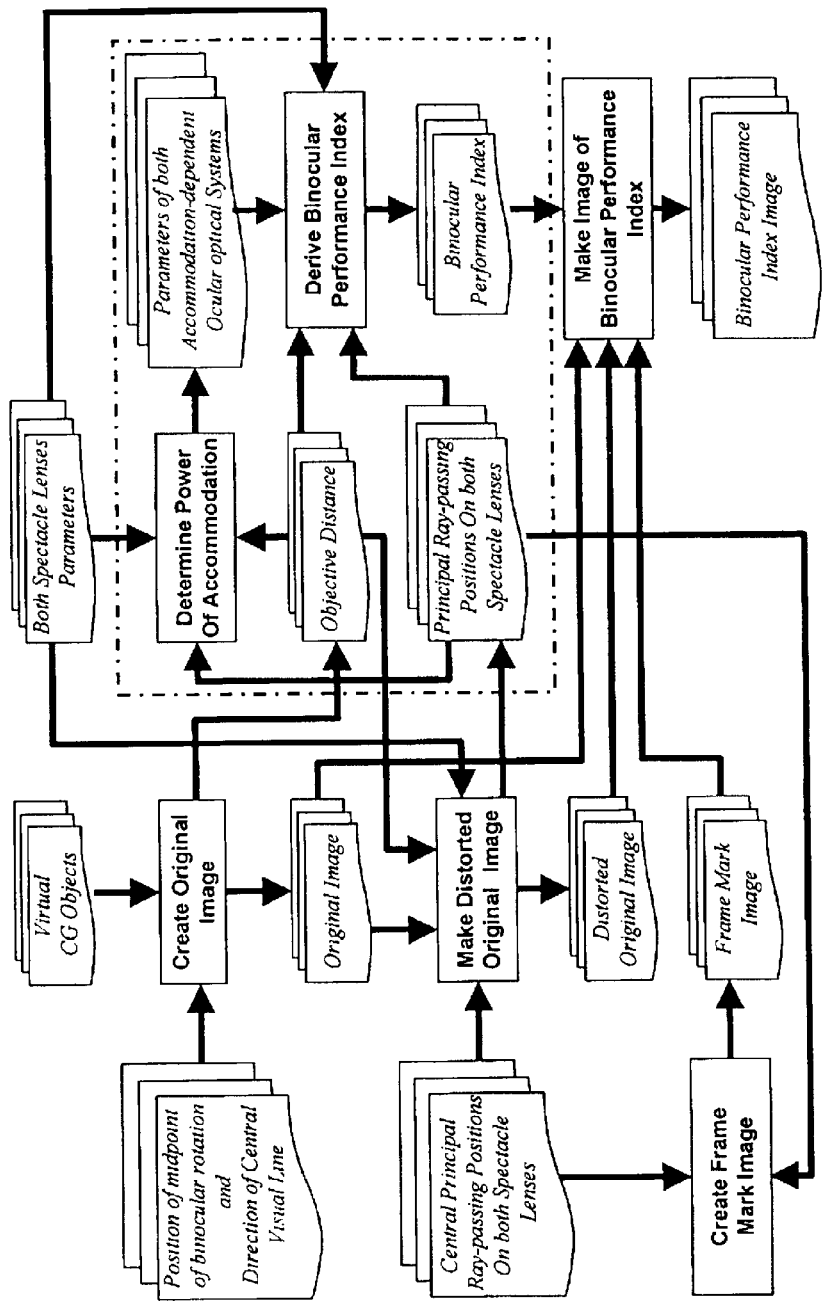
FIG. 1 is a flow diagram showing the steps for creating a binocular performance index image.

The method for indicating binocular performance of spectacle lenses of Embodiment 1 of the present invention will be described as follows with reference to the above-described Figures, especially FIGS. 1–11. FIG. 1 is a diagram showing steps for creating a binocular performance index image of spectacle lenses of Embodiment 1 in accordance with the present invention.

The method for evaluating and/or indicating binocular performance of spectacle lenses in accordance with the present embodiment comprises creating and displaying a still image of the binocular performance index for spectacle lenses when an observer views three-dimensional CG (computer-generated) objects within a visual field as seen through the spectacle lenses placed in front of his eyes. This particular image is called a "binocular performance index image." The binocular performance index image is a digital image of the visual field wherein each pixel in the digital image has a monochromatic luminosity or RGB color luminosity. The monochromatic luminosities, or the RGB color luminosities, for each pixel do not indicate the real color or real brightness of the object point; instead, they indicate a value of the binocular performance index that corresponds to viewing that object point binocularly through the right and left spectacle lenses.

Binocular performance index is an abstract concept. It can be related concretely to several concrete types of quantities or values. Some of these concrete types of quantities or values are taken by analogy from monocular vision like the binocular residual corrective error of right and left spectacle lenses, the binocular clearness index, the binocular point deformation index, or like index, etc. Other concrete types of quantities or values are distinctive ones like binocular vertical deviation angle, deviation between convergence and accommodation, aniseikonic index, etc.

It is noted that the visual field images may manifest in several forms or types. For example, the visual field image may be an original image, which is the visual field image observed with naked eyes so that it does not include any lens distortion. The original image can be considered as the image of the visual field in the object space of an optical system. Another type of visual field image is a lens-distorted original image, which is the visual field image seen with spectacle lenses that includes distortions caused by the lenses. The distorted original image can be considered to be the image of the visual field in the image space of an optical system. There are other special types of images of the visual field. For example, an image of the visual field whose horizontal and vertical coordinates represent positions on the surface of the spectacle lens (right or left), through which the observer sees the corresponding object points in the visual field, represents another type of visual field image. This visual field image helps to fix directly position on the spectacle lens surface where binocular performance is a problem.

The method of another preferred embodiment in accordance with the present invention comprises (1) a step of creating an original image, (2) a step of creating a distorted original image, (3) a step of deriving positions of spectacle frames, (4) a step of deriving a binocular performance index and (5) a step of creating a binocular performance index image.

Step (1): Creating an Original Image

This step comprises creating virtual objects by using computer graphics and placing the objects in a virtual three-dimensional space; placing a midpoint of binocular rotation at a specific position in the virtual three-dimensional space; creating, as the original image, an image of the virtual objects within a visual field defined as a specific range within a pyramid whose apex is located at the midpoint of binocular rotation and whose central axis is oriented along a direction of a specific central visual line; and deriving, with respect to each of a plurality of object points with each object point corresponding to a pixel of the original image, an object distance defined as the distance between the object point and the midpoint of binocular rotation. This step will be described in more detail as follows.

a. Creating Virtual Objects for the Original Image

In accordance with a well-known method of computer graphics, virtual objects are created and placed in a virtual three-dimensional space. For example, a disk, a chair, furniture and other objects may be placed in a virtual room; or, as a further example, a flowerbed, trees and traffic signs may be placed in a virtual outdoor field.

b. Creating an Original Image

Figure 2:
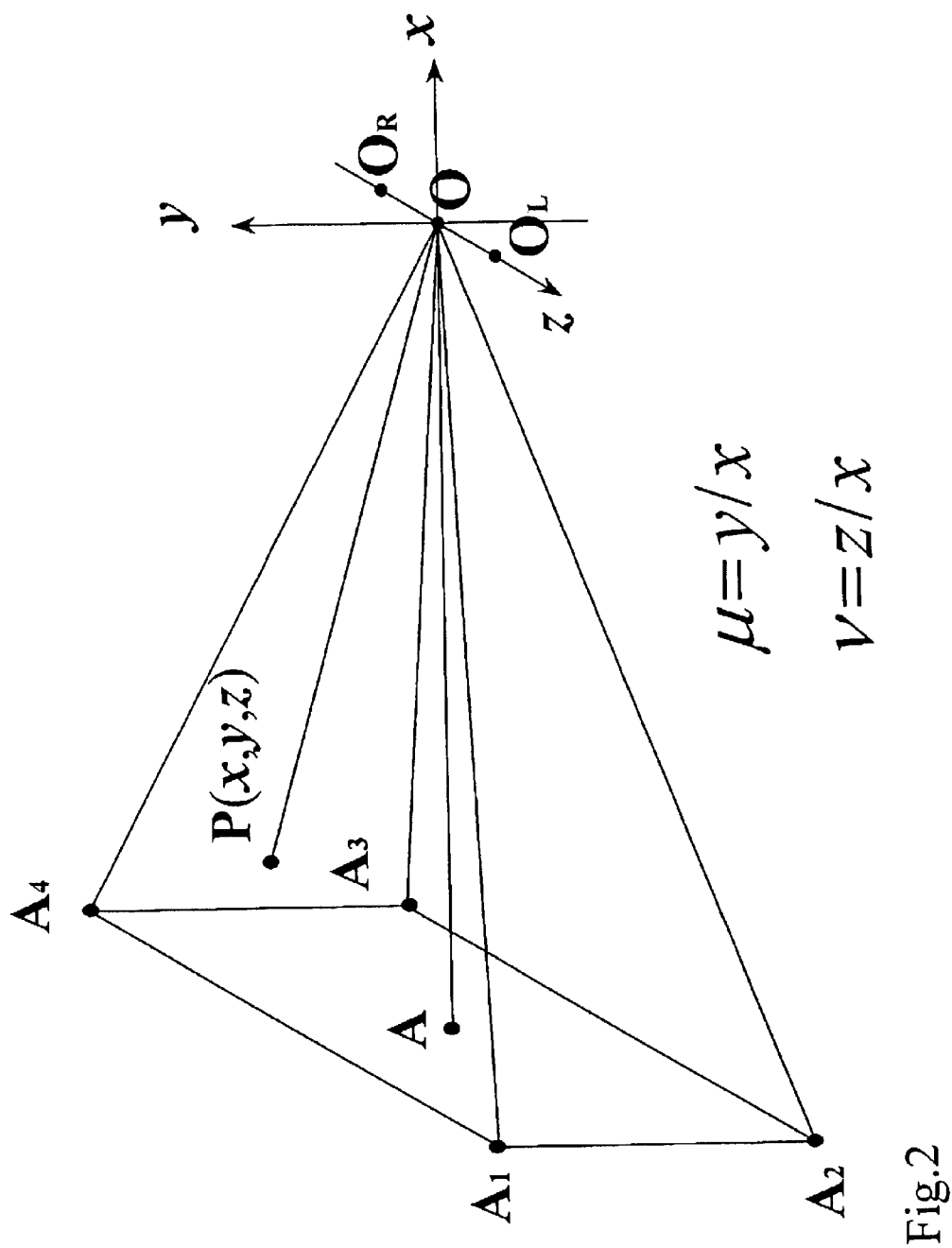
FIG. 2 is a diagram showing the coordinates of the naked eye's visual field.

The midpoint of binocular rotation, defined as the midpoint between both centers of monocular rotation for two lenses, is placed at a specific position in the virtual three-dimensional space. Thereafter, an original image is created as an image of the virtual objects previously created as described above within a visual field. The visual field is defined as a specific range defined within a pyramid whose apex is located at the midpoint of binocular rotation and whose central axis is oriented along a direction of a specific central visual line. More specifically, as shown in FIG. 2, a visual field is defined as a pyramid $A_1A_2A_3A_4$ whose apex is located at O, which is the midpoint of centers of right monocular rotation $O_R$ and left monocular rotation $O_L$, and whose central axis is oriented along the direction of the central visual line OA, which is perpendicular to the line $O_RO_L$. An image is created within this visual field and defined to be the original image. In the pyramidal visual field, the position of an arbitrary point P(x, y, z) on the original image is expressed by coordinates $\mu=y/x$ and $v=z/x$ wherein (x, y, z) are the coordinates of the point within a Cartesian coordinate system whose point of origin is located at O and whose x-axis is oriented along the line AO. When each object point in the visual field is projected in this manner, any straight line in the space is always projected as a straight line on the image. Therefore, the projection has no distortion. An image created by projecting every object point in accordance with this straight line projection serves as the original image.

c. Deriving Object Distance to an Object Point

In the step of creating an original image, the distance between the object point P(x, y, z) and the midpoint of binocular rotation O (i.e., the object distance) is also derived from the values of its coordinates.

Step (2): Creating a Distorted Original Image

In this step, a distorted image, having distortion caused by the spectacle lenses when the original visual field is observed through spectacle lenses, is created, and positions are noted on each spectacle lenses through which each of the object points is observed. The position of an object point observed by both eyes is expressed by the direction of synkinetic binocular rotation. The definition of the direction of synkinetic binocular rotation is the key for determining the spatial perception of binocular vision. In accordance with the study performed by the present inventor, the definition of the direction of synkinetic binocular rotation should satisfy the following principles or conditions:

1. A single unique direction of synkinetic binocular rotation is determined by the directions of right and left monocular rotation;

2. The direction of synkinetic binocular rotation continuously changes with changes in the direction of right and left monocular rotation; and 3. Perception of space based on the direction of synkinetic binocular rotation approximates the perception of space based on the direction of both right and left monocular rotation.

One method of defining the direction of synkinetic binocular rotation is the method using Hering's law. In 1868, Hering proposed Hering's law, which states that, the right eye and the left eye always rotate by the same amount, either in the same direction or in opposite directions. The rotation of both eyes for seeing an arbitrary point in space can be decomposed into two terms: the version and the vergence.

Figure 3:
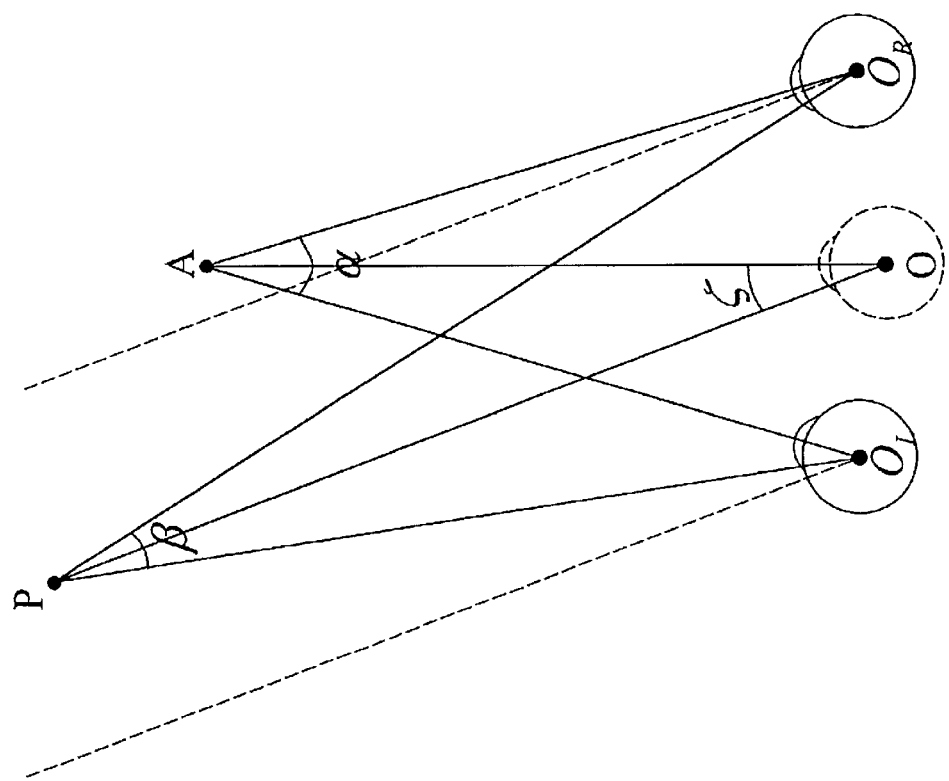
FIG. 3 is a diagram describing the definition of the direction of synkinetic binocular rotation.

As shown in FIG. 3, rotation of each of right and left eyes to see a point P can be decomposed into the version, which is the rotation of the eyes in the same direction by the same amount ζ, and the vergence, which is the rotation of the eyes in opposite directions by the same angle of β/2, in a visual plane containing both centers of monocular rotation and the point P. The direction of the version is defined as the direction of synkinetic binocular rotation, (i.e., the direction along the line which equally divides the angle between the directions of right and left monocular rotations). When the unit vectors in the directions of right and left monocular rotations are expressed by $\bar{r}_R$ and $\bar{r}_L$, the unit vector in the direction of synkinetic binocular rotation may be expressed as $$\bar{r} = \frac{\bar{r}_R + \bar{r}_L}{|\bar{r}_R + \bar{r}_L|}.$$

The angle β is the angle of convergence.

In the Hering's law, the right eye and the left eye are assumed to be completely equal. However, in actuality, a phenomenon of a dominant eye, wherein one eye plays a dominant role compared with the other eye, is observable, although the degree of dominance may be different for each person. Therefore, a coefficient k is introduced in the present invention and the unit vector in the direction of synkinetic binocular rotation is defined as:

$$\bar{r} = \frac{k\bar{r}_R + (1-k)\bar{r}_L}{|k\bar{r}_R + (1-k)\bar{r}_L|}$$

wherein $0 \leq k \leq 1$.

There is a problem if the bisector of the angle between right and left visual line is defined as the direction of synkinetic binocular rotation. For all object points, the extentions of the direction of synkinetic binocular rotation do not converge on a single point. This lack of convergence for all object points makes it necessary to provide a new definition of deformation because the shape of the object has already been changed by the calculation using Hering's Law as modified for a dominant eye, even in the case of the naked eyes.

To avoid this problem, the inventor has provided a new definition of the synkinetic binocular rotation. The direction of the synkinetic binocular rotation is defined as the direction from the point of convergence fixation (P), at the right and left visual line converges, towards the midpoint (O) of the right and left ocular rotation center. In the case of naked eyes, the point of convergence fixation is exactly the object point.

When the object point is viewed through spectacle lenses, the effect of refraction of the lenses must be considered in determining the direction of synkinetic binocular rotation. The direction of rotation of both right and left eyes do not necessarily orientate towards the object point because they orientate along each monocular principal ray that leaves each rear surface of spectacle lens, (i.e., the direction of each monocular rotation). Here, the monocular principal ray is defined as the ray emitted from the object point and going through the spectacle lens toward a center of monocular rotation. Therefore, the direction of synkinetic binocular rotation can be derived from the directions of both right and left monocular rotation taken from the case of naked eyes.

However, the right visual line, drawn from the right rotation center $O_R$ and orientated towards the direction of right monocular rotation, and the left visual line, drawn from the left rotation center $O_L$ and oriented towards the direction of left monocular rotation, do not always converge at a point when the object is seen through spectacle lenses. As shown in FIG. 5, the right visual line plane, which contains the direction of right monocular rotation $\bar{r}_R$ and $O_R O_L$, and the left visual line plane, which contains the direction of left monocular rotation $\bar{r}_L$ and $O_R O_L$, diverge and do not overlap with each other. Consequently, the point of convergence fixation (P') should be redefined in this case.

In the present invention, a binocular visual plane is defined as the plane containing the direction $$\bar{r} = \frac{\bar{r}_R + \bar{r}_L}{|\bar{r}_R + \bar{r}_L|},$$

the bisector of the angle between $\bar{r}_R$ and $\bar{r}_L$, and $O_R O_L$. Both projections of $\bar{r}_R$ and $\bar{r}_L$ on the binocular visual plane must have a point P' at which they intersect with each other. The point P' is then defined as the point of convergence fixation. For this case, the direction of synkinetic binocular rotation can be defined as the direction $$\bar{r} = \frac{\bar{r}_R + \bar{r}_L}{|\bar{r}_R + \bar{r}_L|},$$

the bisector of the angle between $\bar{r}_R$ and $\bar{r}_L$, or the direction from P' to the midpoint O.

Now the position of an object point in the original visual field and in the visual field as viewed through the spectacle lenses, also referred to as the after-lens visual field, have been defined. A distorted original image is an image in which each pixel in the original image has been replaced with or mapped to a new position determined by the change of the position of each corresponding object point from its initial position in the original visual field to its new position in the after-lens visual field.

It is noted that the object point at the center of the visual field should not change its position when replaced with or mapped to its new position in the after-lens visual field from its old position in the original visual field. The corresponding direction rotations and principal rays, whether corresponding to the monocular rotation, the binocular rotation, the right principle ray and the left principle ray, for describing this central point (i.e., center point O of the visual field) are labeled "central." For example, The direction of the synkinetic binocular rotation that describes the synkinetic binocular rotation of this central point O is called the "central synkinetic binocular rotation direction." Likewise, the right principal ray that describes the right principal ray of the central point O is called the "right central principal ray," and etc. In the original visual field, as well as in the after-lens visual field, the direction of the central synkinetic binocular rotation is assigned to be the x-axis of the respective Cartesian coordinate system. Both Cartesian coordinate systems place its origin at the central midpoint O.

Figure 4:
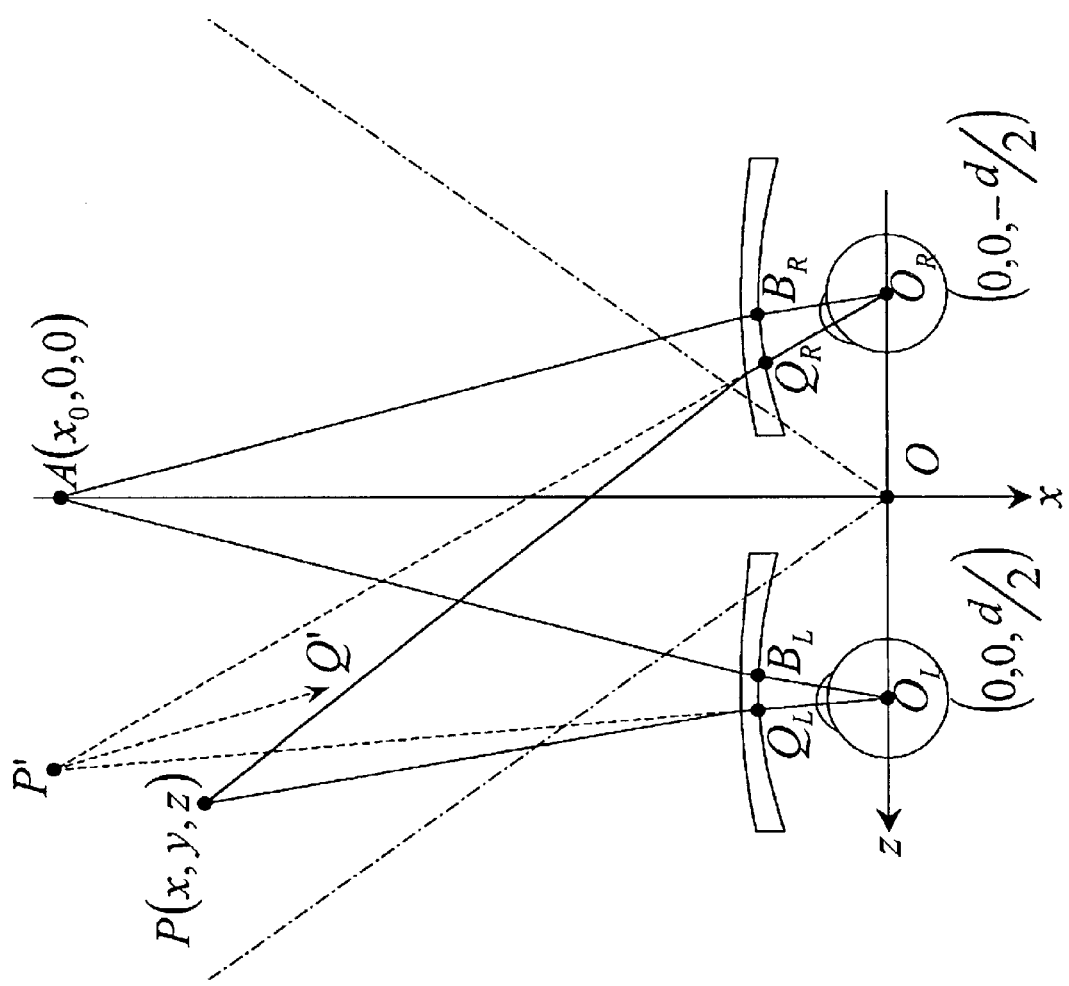
FIG. 4 is a diagram showing the coordinates of the binocular visual field as seen through spectacle lenses.

The central direction of synkinetic binocular rotation can be determined in accordance with the ray tracing method so that the right and left central principal rays pass through the right and left spectacle lenses, respectively, at predetermined positions. As shown in FIG. 4, when spectacle lenses are placed between the central object point A ($x_0$, 0, 0) in the visual field and the right and left centers of monocular rotation $O_R$(0, 0, -d/2) and $O_L$(0, 0, d/2), respectively, it is necessary, in order to see the central object A, that the right eyeball be rotated not in the direction of $O_R$A but in the direction $O_R B_R$ (i.e., toward the position of the right ray on the right spectacle lens). Furthermore, it is necessary that the left eyeball be rotated not in the direction of $O_L$A but in the direction $O_L B_L$ (i.e., toward the position of the left ray on the left lens). The rays $AB_R O_R$ and $AB_L O_L$ are the right and left central monocular principal rays, respectively. The vectors $B_R O_R$ and $B_L O_L$ show the right and left central directions of monocular rotation, respectively. Their unit vectors $\bar{r}_R$ and $\bar{r}_L$ are used to derive the direction of central synkinetic binocular rotation, (i.e., the x' axis in the after-lens visual field).

The positions of the right and left central monocular principal rays on the respective spectacle lenses (i.e., the principal ray-passing positions $B_R$ and $B_L$) are not independently set but are affected by the distance d between the centers of monocular rotation and the distance to the object point.

The position of other object points in the after-lens visual field can be derived using the direction of synkinetic binocular rotation for viewing the object point. As shown in FIG. 4, for an arbitrary point P(x, y, z) the right and left principal ray $PQ_R O_R$ and $PQ_L O_L$ are traced and the point of convergence fixation P'(x',y',z') is derived. P'(x',y',z') is the position in the after-lens visual field of point P(x,y,z), wherein the distorted original image is at a position of ($\mu$'=y'/x', $\nu$'=z'/x') from the position of the original image at ($\mu$=y/x, $\nu$=z/x) so that point P'(x',y',z') replaces point P(x,y,z). Meanwhile the positions of the right and left principal rays on each spectacle lens ($Q_R$ and $Q_L$) are also derived using the ray tracing method.

Although the ray tracing calculation must be carried out with respect to all object points within the visual field to find their directions of synkinetic binocular rotation and principal ray-passing positions on both spectacle lenses, it is possible to obtain these data with fewer calculations while controlling the calculation errors to within a certain range by using a mathematical method called spline interpolation.

(3) Deriving the Positions of Spectacle Frames

In this step, the positions of edges and hidden marks from the right and left spectacle frames on the original image, or the distorted original image, are determined and images of the spectacle frame marks are created using the data representing principal ray-passing positions on each spectacle lens derived in the step of creating a distorted original image. By comparing the image of spectacle frame marks with the distorted original image, the positions on the right and left spectacle lenses through which each of the object points in the image are observed can be precisely determined.

(4) Deriving the Binocular Performance Index

In this step, a binocular performance index is determined for each pixel of the original image, or the distorted original image. The binocular performance index may be a binocular residual corrective error, a binocular clearness index, a binocular point deformation index, a binocular vertical deviation angle, a deviation between convergence and accommodation, an aniseikonic index, or like index, etc. All these binocular performance indexes are derived under the condition that both right and left principal rays are traced from the corresponding object point and each eye is rotated towards its respective direction of monocular rotation. In some cases, such as when binocular clearness index is used, an accommodation-dependent ocular optical system must be introduced to each right and left eye. The power of accommodation of each eye can be set individually depending on the insufficiency of the refractive power of each right and left lens, or to an identical value according to the theory of ophthalmic optics, or to other values.

a. Deriving the Binocular Residual Corrective Error

Figure 10:
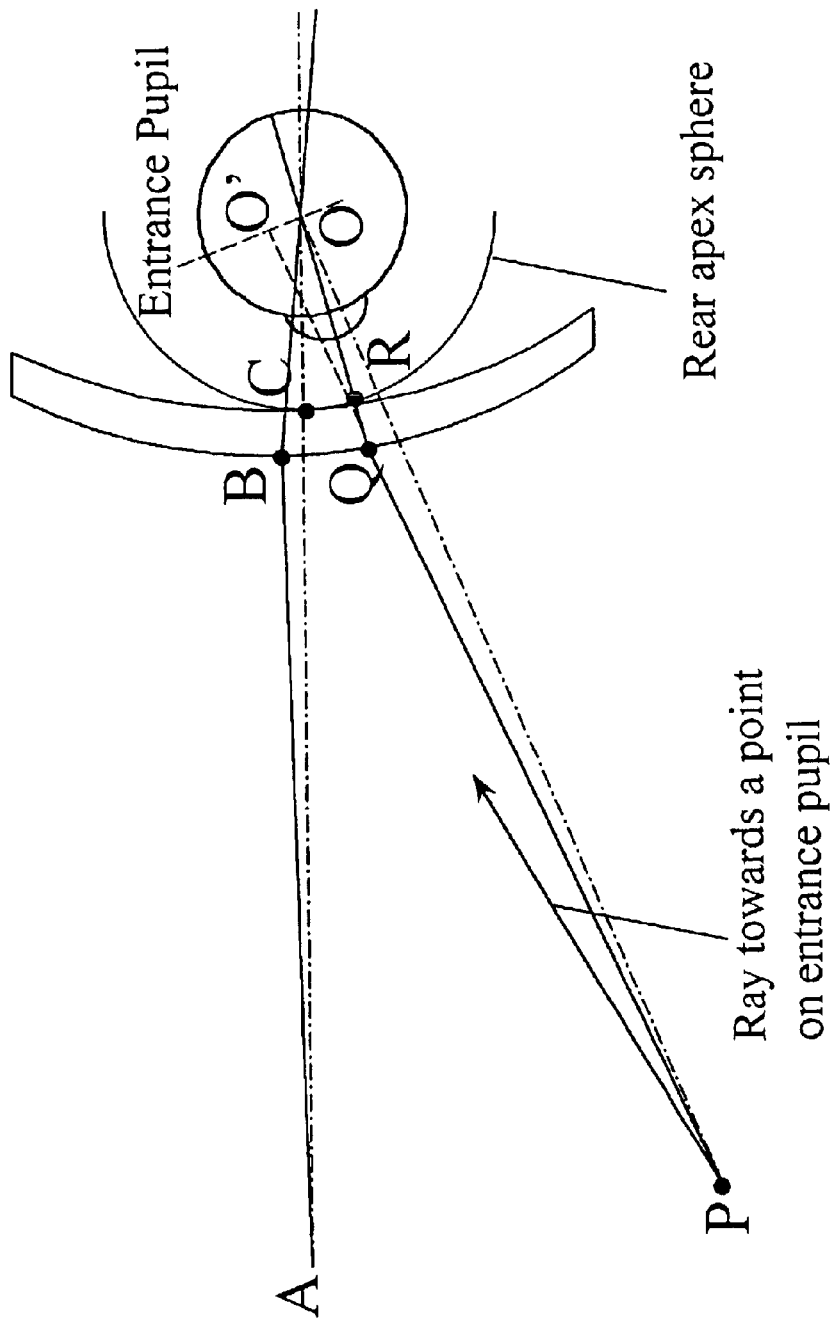
FIG. 10 is a diagram showing the ocular optical system of spectacle lenses when an object is seen by an observer.

As shown in FIG. 10, the ray emitted from an arbitrary object point P is refracted at point Q of the lens first plane and heads toward the center of rotation O. The visual refractive effect of the lens on point P may be represented by the shape of a wave front, which originates from the point P as a spherical wave, or a plane wave (when P is located at infinity), and propagates along the principal ray, wherein at point R, there is an intersection of the ray and a rear apex sphere (i.e., a sphere centered on the center of rotation O and passing through the lens rear apex C). The shape of the wave front near point R may be expressed by the following general expression in a local coordinate system whose origin is the point R and whose x-axis is the RO direction:

$$X_D = (\tfrac{1}{2})D_{yy}y^2 + (\tfrac{1}{2})D_{yz}yz + (\tfrac{1}{2})D_{zz}z^2$$

where $D_{yy}$, $D_{yz}$ and $D_{zz}$ are constants that can be derived by ray tracing.

The refractive state of an eye with astigmatism can also be expressed by the shape of corrective wave front at the point R. The far corrective wave front including astigmatic power and direction is expressed by the following general expression:

$$x_C = \frac{1}{2}C_{yy}y^2 + C_{yz}yz + \frac{1}{2}C_{zz}z^2$$

where $C_{yy}$, $C_{yz}$ and $C_{zz}$ are constants that can be derived from the lens prescription.

The amount of accommodation can also be expressed as a wavefront at the point R:

$$x_A = \frac{1}{2}A(y^2 + z^2)$$

here A is the constant representing the amount of the accommodation power and assumes that no extra astigmatism occurs while the eye performs accommodation.

The residual wavefront is now defined as $$x = x_C - x_A - x_D$$
$$= \frac{1}{2}(C_{yy} - A - D_{yy})y^2 + (C_{yz} - D_{yz})yz + \frac{1}{2}(C_{zz} - A - D_{zz})z^2$$
$$= \frac{1}{2}S_{yy}y^2 + S_{yz}yz + \frac{1}{2}S_{zz}z^2$$

The residual power $S_{ave}$ and the residual astigmatism $S_{as}$ is then derived from the above formula as:

$$S_{ave} = \frac{1}{2}(S_{yy} + S_{zz}) \text{ and}$$
$$S_{as} = 2\left\{\frac{1}{4}(S_{yy} - S_{zz})^2 + S_{yz}^2\right\}^{1/2}.$$

The residual power and the residual astigmatism can be used to evaluate the binocular residual corrective error. Ideally both of them are zero. Correcting for when the the residual power is zero, i.e., $S_{ave}=0$, the accommodation power would be $$A = \frac{1}{2}(C_{yy} + C_{zz}) - \frac{1}{2}(D_{yy} + D_{zz}) = C_{ave} - D_{ave}.$$

However, the value of A must be assigned a value within a range from 0 to a maximum $A_{max}$. So A should expressed as:

$$A = \begin{cases} 0 & C_{ave} - D_{ave} < 0 \\ C_{ave} - D_{ave} & 0 < C_{ave} - D_{ave} < A_{max} \\ A_{max} & C_{ave} - D_{ave} > A_{max}. \end{cases}$$

In the case of binocular vision, the power of accommodation of each eye can be assigned values for $A_R$ and $A_L$ individually as determined by the above formula, or each eye can be assigned an identical value for AR and AL according to the theory of physiological optics. The identical value for A may be assigned as the minimum between $A_R$ and $A_L$, or the average of $A_R$ and $A_L$, or the value which provides the best balance with convergence, or the value with which the most clear retinal image may be obtained, and etc. In this embodiment, the identical values for A is assigned to be $A_R$ and $A_L$.

In the case of binocular vision, not only the residual power astigmatism of both eyes, but also the spatial difference between the right and left eyes need to be reduced. Here an average wavefront and a differential wavefront are defined as:

$$x_{ave} = \frac{1}{2}(x_R + x_L),$$
$$x_{diff} = (x_R - x_L),$$

where residual power astigmatism can also be used as the binocular residual corrective error.

Although the ray tracing calculation method must be carried out with respect to all object points within the visual field to derive their binocular residual corrective error, it is possible to derive these results with less calculation while controlling the calculation errors within a certain range by using the mathematical method called spline interpolation.

b. Deriving the Convergence and the Binocular Vertical Deviation

When an observer views an object in the visual field with both of his eyes, as shown in FIG. 3, he notices that the object point is located at a direction of the version component of the binocular rotation and at a distance which can be derived from the angle β of the convergence. When he wears spectacle lenses and views the same object point again, the directions of both right and left visual lines (i.e. monocular rotation directions) have been changed as shown in FIG. 4. If an intersection point P' at the extension of both directions of monocular rotation $Q_R O_R$ and $Q_L O_L$ exists, the angle of convergence is the angle $O_L P' O_R$. However, P' does not always exist because the directions of monocular rotation $Q_R O_R$ and $Q_L O_L$ do not necessarily converge in all cases.

As shown in FIG. 5, the right visual line plane, which contains $Q_R O_R$ (whose unit vector is $\bar{r}_R$) and $O_R O_L$, and the left visual line plane, which contains $Q_L O_L$ (whose unit vector is $\bar{r}_L$) and $O_R O_L$, do not completely overlap each other. As described in the step of creating a distorted original image, the point of convergence fixation(P') should be redefined in this case. In the present invention, a binocular visual plane is defined as the plane containing the direction $$\bar{r} = \frac{\bar{r}_R + \bar{r}_L}{|\bar{r}_R + \bar{r}_L|},$$

the bisector of the angle between $\bar{r}_R$ and $\bar{r}_L$, and $O_R O_L$. Both projections of $\bar{r}_R$ and $\bar{r}_L$ on the binocular visual plane must have a point P' at which they intersect with each other. The point P' is then defined as the point of convergence fixation and the angle β of the convergence is defined as the angle $O_L P' O_R$. Angle β approximately equals O when P' is at the infinite distance. Angle β takes a negative value when P' is at the back side since both eyes are divergent.

The amount of convergence can also be evaluated by the reciprocal of the distance OP', or approximated by $$P_{Conv} = \frac{1}{OP'} \approx \frac{2\tan\frac{\beta}{2}}{d\cos\zeta}.$$

(See FIGS. 3 and 4). This value for the amount of convergence is defined as equivalent to the power of convergence in this invention. Using this definition, we can easily compare the accommodation and convergence, both of these parameters having a close relationship with each other according to physiological optics. When the object point is viewed without spectacle lenses, the power of convergence and the power of accommodation are almost equal. However, when a pair of spectacle lens is worn, a disagreement between these parameters may occur (i.e., the assumption that the power of convergence and the power of accommodation are almost equal may not be accurate). This disagreement may be the reason for discomfort experienced by some people while wearing spectacle lenses. Therefore, a binocular performance index can be defined as $P_{conv}-A$, where A is the same power of accommodation determined in the step of deriving the binocular residual corrective error.

Another reason for discomfort experienced while wearing spectacle lenses may be due to the vertical deviation between right and left directions of monocular rotation. As shown in FIG. 5, in the case when both visual line planes do not completely overlap with each other, each eye must vertically rotate a different angle relative to the other eye. This may cause discomfort because both eyes always vertically rotate at the same angle according to the natural physiology of the eye. The situation is similar to the cases of hyperphoria or hypophoria; therefore, to take this factor into account, a binocular performance index is defined as the difference of the vertical rotation angles between the two eyes.

The angle of convergence and the vertical deviation can be determined using the quadrangular pyramid in the lower portion of the diagram shown in FIG. 5, where $\bar{r}_R$ and $\bar{r}_L$ are the unit vectors of the right and left direction of monocular rotation, $$\bar{r} = \frac{\bar{r}_R + \bar{r}_L}{|\bar{r}_R + \bar{r}_L|}$$

is the bisector of the angle between $\bar{r}_R$ and $\bar{r}_L$, the line AB is placed on the binocular visual line plane which contains $O_R O_L$ and $\bar{r}$, the line CD is placed on a plane which contains $\bar{r}$ and is perpendicular to the binocular visual line plane. The angle of convergence is derived as $\beta = \angle AOB$, and the angle of vertical deviation is derived as $\delta = \angle COD$. For convenience, the vertical deviation is redefined as $$200 \tan\frac{\delta}{2},$$

which has units of prism diopter.

Although the ray tracing calculation must be carried out with respect to all object points within the visual field to derive the angles of convergence and vertical deviation for viewing these angles, it is possible to derive the angles of convergence with less calculation while keeping the calculation errors within a certain range by using the mathematical method called spline interpolation.

c. Deriving Point Deformation Indexes

This step is a step of deriving both monocular and binocular point deformation indexes indicating a degree of optical deformation that occurs when viewing an object point through specific positions on each of right and left spectacle lens, or when viewing an object through both lenses. According to the present invention, point deformation is defined as how a small circle centered at the object point changes its shape while viewing the point object and the small circle through the spectacle lenses. In most cases, the deformed shape approximates an ellipse, so the point deformation index can be defined using the parameters of an ellipse.

Figure 6:
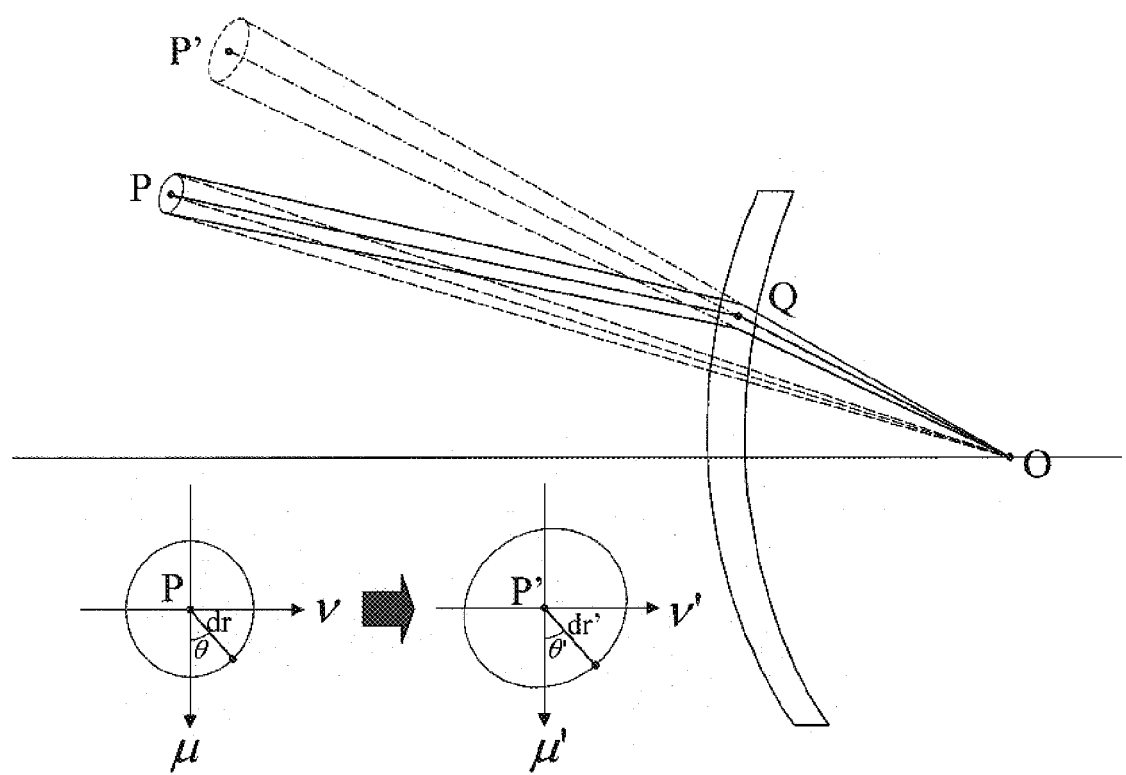
FIG. 6 is a diagram describing the definition of the binocular point deformation index.

The deformed ellipse is obtained by tracing nearby rays of the principal ray from the object point. As shown in FIG. 6, tracing each principal ray from each point $(dr,\theta)$ on a small circle orbit of radius dr centered at object point P is used to determine its corresponding position $(dr',\theta')$ in after-lens space, and the locus of the corresponding deformed ellipse can be determined. Here, "dr" is taken to be a tangent of the differential angle from OP, and is not meant to be interpreted as a length in space.

Practically, it is not necessary to trace all principal rays from points on the circle. If the value of the partial derivative of the differential angle in after-lens space by the differential angle in object space $$\frac{\partial \mu'}{\partial u}, \frac{\partial \mu'}{\partial v}, \frac{\partial v'}{\partial u}, \frac{\partial v'}{\partial v},$$

is calculated, or, conversely, if the partial derivative of the differential angle in object space by the differential angle in after-lens space $$\frac{\partial \mu}{\partial u'}, \frac{\partial \mu}{\partial v'}, \frac{\partial v}{\partial u'}, \frac{\partial v}{\partial v'},$$

is calculated, then the deformed ellipse can be derived. The latter case can be explained, wherein the partial derivative functions are rewritten as $$\frac{\partial \mu}{\partial u'} = A, \frac{\partial \mu}{\partial v'} = B, \frac{\partial v}{\partial u'} = C, \frac{\partial v}{\partial v'} = D:$$

$$d\mu = Ad\mu' + Bdv'$$
$$dv = Cd\mu' + Ddv'$$
$$dr^2 = d\mu^2 + dv^2$$
$$= (A^2 + C^2)d\mu'^2 + 2(AB+CD)d\mu'dv' + (B^2+D^2)dv'^2$$
$$= dr'^2 \left( \frac{A^2+B^2+C^2+D^2}{2} + \frac{A^2-B^2+C^2-D^2}{2}\cos 2\theta' + (AB+CD)\sin 2\theta' \right)$$

Therefore, $$\left(\frac{dr'}{dr}\right)^2 = \frac{p}{1+e\cos 2(\theta'-\alpha)}.$$

Here, $$p = \frac{2}{A^2+B^2+C^2+D^2},$$

$$e = \frac{\sqrt{(A^2-B^2+C^2-D^2)^2 + 4(AB+CD)^2}}{A^2+B^2+C^2+D^2}$$

$$= \frac{\sqrt{(A^2+B^2+C^2+D^2)^2 - 4(AD-BC)^2}}{A^2+B^2+C^2+D^2},$$

$$\tan 2\alpha = \frac{AB+CD}{A^2-B^2+C^2-D^2}.$$

It is apparent that p>0, and 0<e<1. Therefore, the relationship between the magnifying power $$\frac{dr'}{dr}$$

and the azimuth θ' should be an ellipse. This ellipse is called a point deformation ellipse. The maximum and minimum magnifying power (i.e., the major and minor axis of the point deformation ellipse) are, respectively, $$a = \sqrt{\frac{p}{1-e}}, b = \sqrt{\frac{p}{1+e}}.$$

In the present invention, a scale factor $\sqrt{ab}$, a ratio of major axis to minor axis $$\frac{a}{b}$$

and a combination of the two values are defined as a point deformation index for indicating the degree of deformation. Here, $$\sqrt{ab} = \sqrt{\frac{p}{\sqrt{1-e^2}}} = \ldots = \frac{1}{|AD-BC|}, \frac{a}{b} = \sqrt{\frac{1+e}{1-e}}.$$

Three point deformation ellipses, being the monocular point deformation ellipse based on the direction of monocular rotation for the right eye, the monocular point deformation ellipse based on the direction of monocular rotation for the left eye, and the binocular point deformation ellipse based on the direction of binocular rotation, are derivable with the method described above. Not only the binocular point deformation, but also any disagreement of monocular point deformations, can cause discomfort while viewing the object point binocularly. This disagreement in monocular point deformations is called aniseikonia. As an index for indicating the severity of aniseikonia, the inventor defines a ratio of scale factors $$\sqrt{\frac{a_R b_R}{a_L b_L}}.$$

This index for indicating the aniseikonia is equivalent to the square root of the ratio of the area of the right point deformed ellipse to the area of the left point deformed ellipse.

Although the ray tracing calculation must be carried out with respect to all object points within the visual field to derive the point deformation ellipses, it is possible to derive the point deformation ellipses with less calculation while keeping the calculation errors within a certain range by using the mathematical method called spline interpolation. Besides tracing the nearby principal rays, the partial derivatives $$\frac{\partial \mu}{\partial u'}, \frac{\partial \mu}{\partial v'}, \frac{\partial v}{\partial u'}, \frac{\partial v}{\partial v'}$$

can also be calculated from the values of partial derivatives of a spline interpolation function of previously-obtained principal ray data.

d. Deriving Point Spread Functions (PSFs)

This step describes how to evaluate the visual clarity, or "clearness of vision," of an object point binocularly. It comprises deriving both right and left monocular PSFs, and combining them to a binocular PSF. With respect to each of the object points, each of which corresponds to a pixel of the original image, both distances from the object point to the right and left centers of monocular rotation are derived from the objective distance determined in the original image creating step. The powers of accommodation of right and left ocular optical systems are determined with the method described in the step of deriving binocular residual corrective error. A monocular PSF is derived for each of the right and left eyes in a composed optical system comprising the spectacle lens and the accommodation-dependent ocular optical system, which is rotated in accordance with the direction of monocular rotation. The binocular PSF is determined by combining both monocular PSFs. This step will be described more specifically as follows.

(i) Introduction of an Accommodation-dependent Ocular Optical System

To obtain the PSF on the retina, the introduction of an ocular optical system is necessary. The eye has the function of accommodation in accordance with the distance to an object and this function should be taken into consideration. In the present embodiment, the accommodation-dependent ocular optical system reported by R. Navarro et al. is used. In the Navarro model, not only the paraxial value, but also the spherical aberration and the chromatic aberration, are adjusted from actually-measured values of an eye. The model has a simple four-surface structure including (1) the anterior surface of the cornea, (2) the posterior surface of the cornea, (3) the anterior surface of the crystalline lens, and (4) the posterior surface of the crystalline lens. Three surfaces among the four surfaces are aspheric axially symmetrical quadratic surfaces, which are the anterior and posterior surfaces of the cornea and the anterior surface of the crystalline lens. Because the crystalline lens does not have a gradient index, the tracing calculation can be conducted easily. The radius of curvatures, the thickness of various optical structures in the model, and the degrees of asphericity change in proportion to the logarithm of the power of accommodation. FIG. 7 shows a table listing ocular optical parameters of the Navarro model in the state without accommodation. FIG. 8 shows a table listing accommodation dependencies of ocular optical lens parameters. Each aspherical surface is expressed as $y^2+z^2+(1+Q)x^2-2rX=0$, wherein Q represents the degree of asphericity.

(ii) Deriving a Monocular PSF

A) Meaning of PSF

Figure 9:
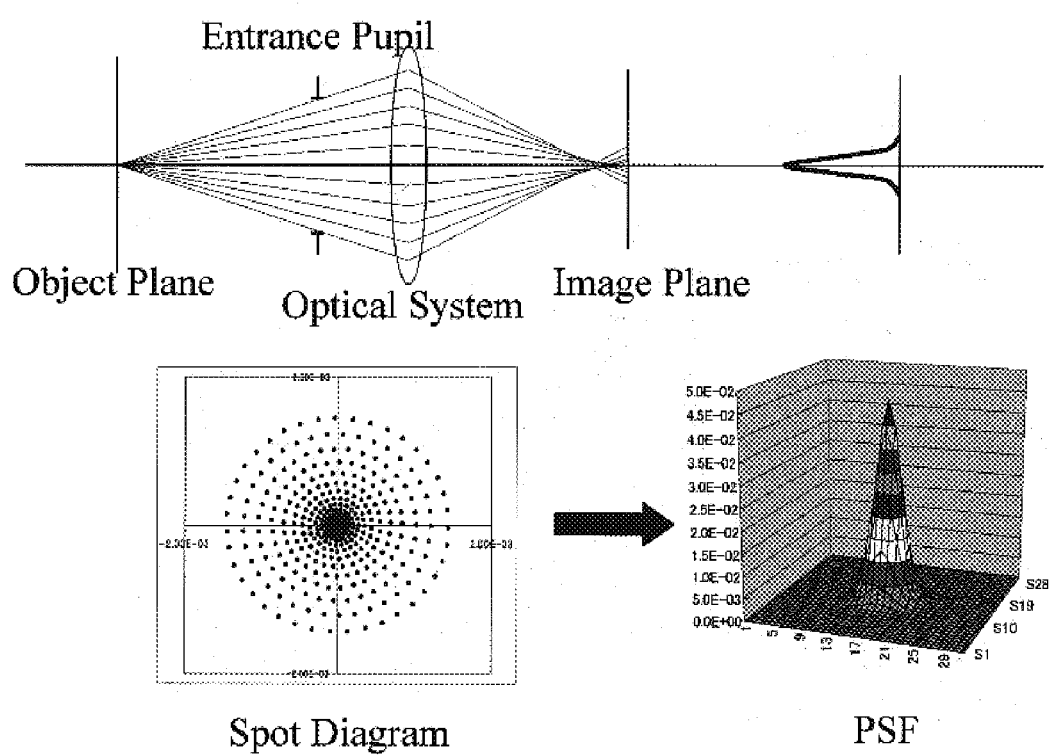
FIG. 9 is a diagram describing a PSF (point spread function).

As shown in FIG. 9, a PSF is the function showing the concentration of a cluster of spots on the image plane of rays, which are emitted, from an object point. The function can be expressed as the distribution of the density of spots. In a perfect optical system, all spots are concentrated at the image point and the distribution of PSF becomes a straight line perpendicular to the image plane. However, in general, the distribution has a broader shape similar to a Gaussian distribution as shown in FIG. 9.

B) Method for Deriving PSF

FIG. 10 shows the composite optical system for obtaining the PSF when a point P is seen through a position Q on a spectacle lens. The ray emitted from the object point P is refracted at the point Q on the surface of the lens. The ray changes its direction at Q towards the center of monocular rotation O. To the eye, the object point P is seen as if the object point were located on the extension of the direction QO. As described above, when the point P is seen, the optical axis of the eyeball is rotated in the direction QO and the power of accommodation is set in accordance with the distance to the object point P and the refractive power at the point Q. The accommodation is performed based on the result. When the accommodation has been completed, the optical system is fixed and PSF can be derived.

As described above, PSF is the densities of spots on the image plane of rays, which are emitted from an object point, that pass through each of many points equally distributed on the "entrance pupil." The entrance pupil, exactly, is located at the conjugative position of the iris pupil on the object side. However, the iris pupil changes its position while the eye is rotated, also its conjugative position on the object side moves depending on the accommodation. On the other hand, the center of monocular rotation is placed at a fixed position, and the distance to the conjugative point of the iris pupil is much smaller than the distance to the object point; therefore, when no spectacle lens is placed in front of the eye, it causes no problems or errors to assume that the entrance pupil is located at the center of monocular rotation. When a spectacle lens is placed in front of the eye, the entrance pupil of the entire optical system should be located at the conjugative point of the center of monocular rotation via the spectacle lens. However, the position of the entrance pupil varies delicately when a progressive addition lens is used since the refractive power is different depending upon the position of the lens at which the ray passes. Because the amount of this position variation is much smaller than the distance to the object point, it can be assumed that the position of the entrance pupil is located at a point O' on the extension of the line PQ which satisfies the condition PO=PO'.

Figure 11:
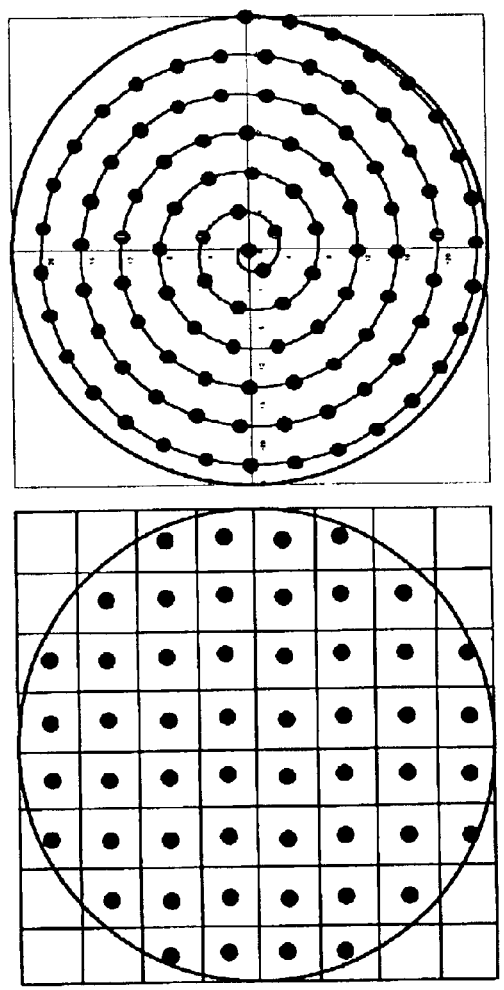
FIG. 11 is a diagram showing division of an entrance pupil.

To determine an accurate PSF, it is important that the entrance pupil be divided into many uniformly distributed small areas. There are two kinds of dividing methods used for this purpose: grid division and spiral division as shown in FIG. 11. Although grid division permits good uniformity, it allows tracing of only about 70% of a predetermined number of rays because it has wasteful portions at its four corners that are not traced. On the other hand, spiral division causes no wasteful ray tracing while maintaining good uniformity. Spiral division is therefore adopted in the present embodiment of the invention.

As described above, the PSF can be obtained by tracing many rays emitted from the object point and passing through points determined by uniformly splitting the entrance pupil into tracing divisions, and calculating the density of the spots on the retinal surface. Although rays emitted from each object point and passing through each divided point of the entrance pupil must be traced to obtain the PSF with the method described above, the use of spline interpolation allows the position of the spots on the retina to be calculated with less calculation within a given error range, and therefrom, the PSF, which is the density of spots on the surface of retina, can be alternately derived.

When the distorted original image and the PSF obtained in accordance with the above method are convoluted, blur, which is found when external objects are observed through a spectacle lens, can be accurately modeled. However, deriving the PSF in accordance with the above method requires a long time for calculation, and is not convenient for conducting a quantitative analysis of the imaging performance of a lens. A quantitative analysis of lens imaging performance can be easily conducted by approximating the PSF to a suitable type of function, and using the parameters of the assigned function for the calculation. A method for approximating the PSF with a two-dimensional normal distribution function will be described as follows.

In the following approximation, the two dimensional normal distribution function:

$$p(\mu, v) = \frac{1}{2\pi\sigma_\mu\sigma_v\sqrt{1-\rho^2}}\exp\left(-\frac{1}{2(1-\rho^2)}\left(\frac{\mu^2}{\sigma_\mu^2} - 2\rho\frac{\mu v}{\sigma_\mu\sigma_v} + \frac{v^2}{\sigma_v^2}\right)\right)$$

$\mu$ and $v$ represent the deviation in the vertical and horizontal directions, respectively, on the retina and $\sigma_\mu, \sigma_v$ and $\rho$ represent parameters of a normal distribution. These parameters satisfy the following relations:

$$-1 < \rho < 1$$
$$\sigma_\mu > 0$$
$$\sigma_v > 0$$

The locus of the point at which the exponent in the above equation has the value of $-\frac{1}{2}$ is an ellipse expressed by:

$$\frac{\mu^2}{\sigma_\mu^2} + \frac{v^2}{\sigma_v^2} - \frac{2\rho\mu v}{\sigma_\mu\sigma_v} = 1 - \rho^2$$

The above ellipse can express the spreading range of the PSF. The ratio of the length of the major axis to the length of the minor axis and the direction of the major axis of the ellipse are closely related to the degree and the direction of astigmatism.

The method for obtaining the parameters $\sigma_\mu, \sigma_v, \rho$ of the two-dimensional normal distribution function from the ray data is a method in which statistical values of spots scattered on the image plane $(\mu, v)$, (each spot corresponding to each dividing point on the entrance pupil), are calculated and the calculated values are used as the parameters $\sigma_{\mu,o84}, \rho$. Thus, the values can be obtained as follows:

$$\sigma_{\mu 0} = \sqrt{\frac{1}{N}\sum_i \mu_i^2}$$

$$\sigma_{v 0} = \sqrt{\frac{1}{N}\sum_i v_i^2}$$

$$\rho = \frac{1}{N}\sum_i \mu_i v_i / \sigma_\mu \sigma_v$$

In the above formulae, N represents the number of rays and $(\mu_1, v_1)$ represents the coordinates of a spot. When $\sigma_{\mu 0}, \sigma_{v 0}$ and $\rho$ are directly used as the parameters of the approximating normal distribution, there is a possibility that the result will be different from the actual PSF depending on the condition of the distribution. In such a case, it is necessary that a suitable proportional constant k be selected and the parameters be adjusted so that $\sigma_\mu = k\sigma_{\mu 0}$ and $\sigma_v = k\sigma_{v 0}$.

As described above, the parameters of the two-dimensional normal distribution function approximating the PSF can be calculated by using the statistical values of ray spots on the retina. It is occasionally convenient that the two-dimensional normal distribution function be expressed as a function of polar coordinates. By substituting $\mu = r\cos\theta$ and $v = r \sin \theta$ into the above equation and rearranging the resultant equation, the following equation can be obtained:

$$p(r, \theta) = \frac{\sqrt{A^2 - B^2}}{2\pi} \exp\left(-\frac{r^2}{2}(A - B\cos(2\theta - 2\alpha))\right)$$

The parameters can be converted as follows:

$$A = \frac{1}{2(1-\rho^2)} \left( \frac{1}{\sigma_\mu^2} + \frac{1}{\sigma_v^2} \right)$$

$$B = \frac{1}{2(1-\rho^2)} \sqrt{\left( \frac{1}{\sigma_\mu^2} - \frac{1}{\sigma_v^2} \right)^2 + \frac{4\rho^2}{\sigma_\mu^2 \sigma_v^2}}$$

$$\tan 2\alpha = \frac{2\rho \sigma_\mu \sigma_v}{\sigma_\mu^2 - \sigma_v^2}$$

When the PSF is approximated with the two-dimensional normal distribution function and the parameters of the latter function are calculated as described above, although it is still necessary to carry out ray tracing and statistical calculation to determine the parameters of the two-dimensional normal distribution function for all object points, the amount of calculation is reduced while the calculative error can be maintained within a certain range using spline interpolation.

(iii) Deriving a Binocular PSF

The visual acuity with both eyes is generally believed to be better than the visual acuity with a single eye. Therefore, the binocular PSF is expected to have a sharper shape than either the right or left monocular PSF individually. In the present embodiment, combining both right and left monocular PSFs in accordance with the following principles provides the binocular PSF:

1. When the monocular PSF for the right eye and the monocular PSF for the left eye are close to each other, the combined PSF is of a distribution, which is more concentrated than each distribution of both monocular PSFs;

2. When the monocular PSF for the right eye and the monocular PSF for the left eye are different from each other to a great degree, the combined PSF is of a distribution which is close to the most concentrated distribution between both monocular PSFs; and 3. Continuity and uniqueness of the combined PSF are maintained.

As an example of the method for deriving the combined binocular PSF from the right and left monocular PSF, the following method is described. To begin, the PSF is approximated with a normal distribution function, which is represented by an ellipse:

$$r^2 = \frac{1}{(A - B\cos(2\theta - 2\alpha))}$$

When the parameters of the ellipse representing the right monocular PSF are represented by $A_R$, $B_R$ and $\alpha_R$ and the parameters of the ellipse representing the left monocular PSF are represented by $A_L$, $B_L$ and $\alpha_L$, the parameters $A$, $B$ and $\alpha$ of the ellipse representing the combined binocular PSF can be obtained as shown in the following:

$$\frac{1}{r^2} = \frac{1}{r_R^2} + \frac{1}{r_L^2} = A_R + A_L - (B_R \cos(2\theta - 2\alpha_R) + B_L \cos(2\theta - 2\alpha_L))$$

$$= A - B\cos(2\theta - 2\alpha)$$

The above equation leads to the following relations:

$$A = A_R + A_L$$

$$B = \sqrt{B_R^2 + B_L^2 + 2B_R B_L \cos 2(\alpha_R - \alpha_L)}$$

$$\tan 2\alpha = \frac{B_R \sin 2\alpha_R + B_L \sin 2\alpha_L}{B_R \cos 2\alpha_R + B_L \cos 2\alpha_L}$$

Figure 12:
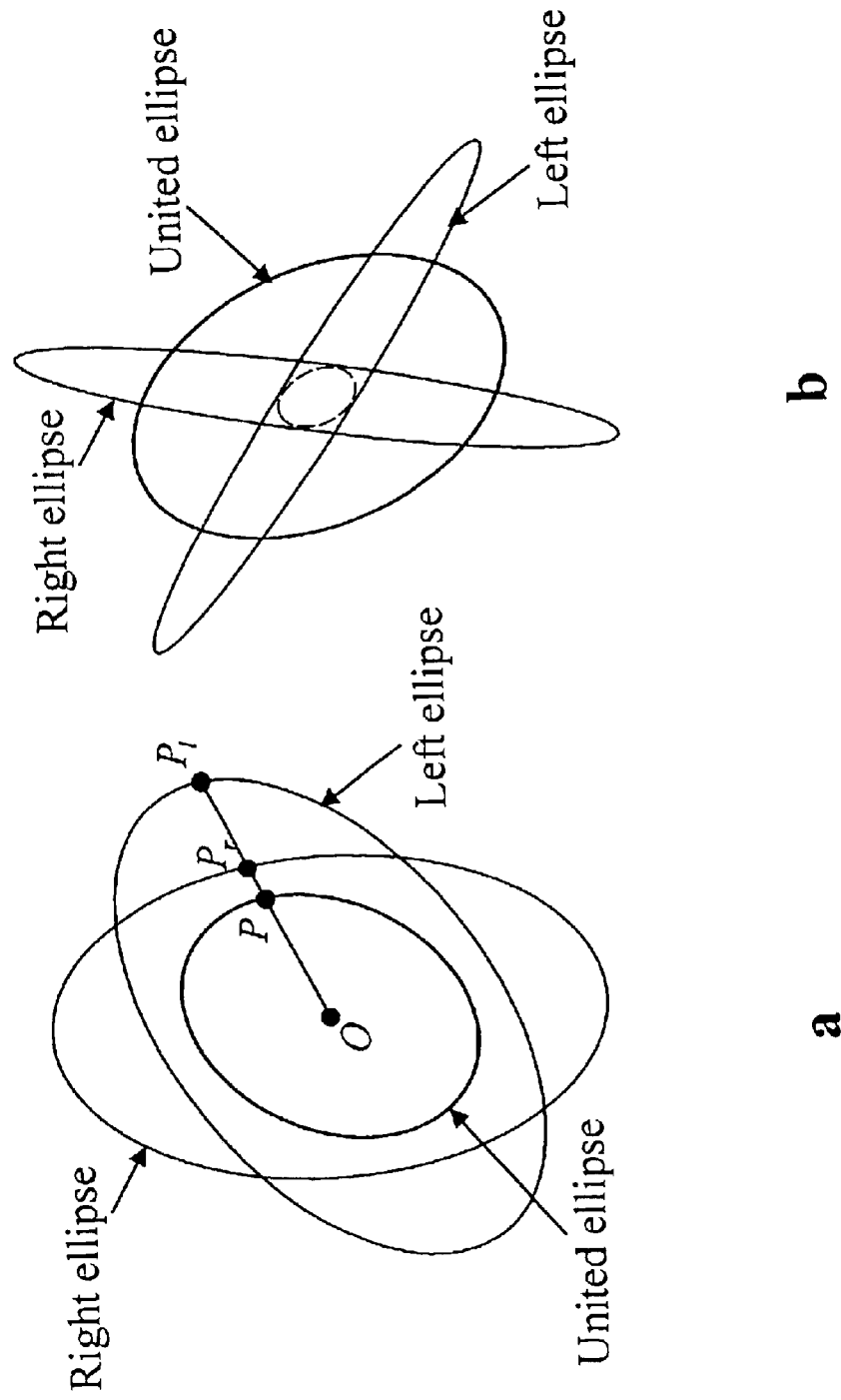
FIG. 12 is a diagram showing combining of the binocular PSF.

FIG. 12a shows ellipses representing the right and left monocular PSF (the right and left ellipses, respectively) and an ellipse representing the combined binocular PSF (the combined ellipse). The above method is occasionally not applicable. In the case shown in FIG. 12b, both eyes have great astigmatisms and the astigmatism directions are significantly different. The result is that the combined binocular PSF distributes within an inadequately small area. Therefore, it is necessary to adjust the size of the combined ellipse in accordance with the similarity of the right and left ellipses. For example, the adjustment is made by multiplying the area of the ellipse obtained above by a coefficient $\kappa = 2S_C/(S_R + S_L)$, wherein $\kappa$ is the ratio of the area of a common portion $S_C$ of both right and left ellipse to the average of areas of both ellipses $(\frac{1}{2}) \times (S_R + S_L)$. The result of the adjustment can be expressed as:

$$A = \kappa(A_R + A_L)$$

$$B = \kappa \sqrt{B_R^2 + B_L^2 + 2B_R B_L \cos 2(\alpha_R - \alpha_L)}$$

$$\tan 2\alpha = \frac{B_R \sin 2\alpha_R + B_L \sin 2\alpha_L}{B_R \cos 2\alpha_R + B_L \cos 2\alpha_L}$$

When the combined binocular PSF is approximated with the two-dimensional normal distribution function and the parameters of the latter function are derived as described above, it is still necessary to calculate parameters of each right and left monocular PSF and further calculate the binocular PSF for all object points; however, the amount of calculation can be reduced while maintaining the calculation error within a certain range using spline interpolation.

(iv) Deriving a Clearness Index from PSF

The clearness index indicates the scale of a spreading range of the PSF. The smaller the clearness index is, the finer the image quality is, and the more visually clear is the image. The spreading range of a PSF, approximated by a two-dimensional normal distribution function, may be represented by an ellipse, as mentioned above. So the clearness index of such a PSF may be defined as a value that indicates the size of the ellipse representing the two-dimensional normal distribution. There are several size parameters for the ellipse to be selected from like the area, $\sigma_\mu + \sigma_v$, $\sqrt{\sigma_{82}^2 + \sigma_{v^2}}$, etc. If the area of the ellipse were defined as a clearness index, the clearness index would be zeroed when the ellipse is degenerated to a line segment. A zero clearness index means that the image quality is good no matter how big the residual astigmatism is. Therefore, it is not appropriate to define the area of the ellipse as the clearness index. Also, it should be assured that the clearness index remains constant while rotating the ellipse without changing its shape. In this case, $\sigma_\mu + \sigma_v$ and is not appropriate to define the clearness index. In the present embodiment $\sqrt{\sigma'^2_{\mu 30} \sigma_{v^2}}$ which is the half diagonal length of a rectangle that circumscribes the ellipse, is defined as clearness index because this shape remains constant when rotating the ellipse.

(5) Creating Binocular Performance Index Image

This step is a step of creating a binocular performance index image and overlaying the lens frame mark image created in the frame position-obtaining step on the binocular performance index image. The binocular performance index image is based on the original image or on the distorted original image. For each pixel a monochromatic luminance or a set of luminances of three primary colors of RGB is assigned in accordance with the value of performance index of the object point corresponding to the pixel determined in the performance index obtaining step.

Figure 13:
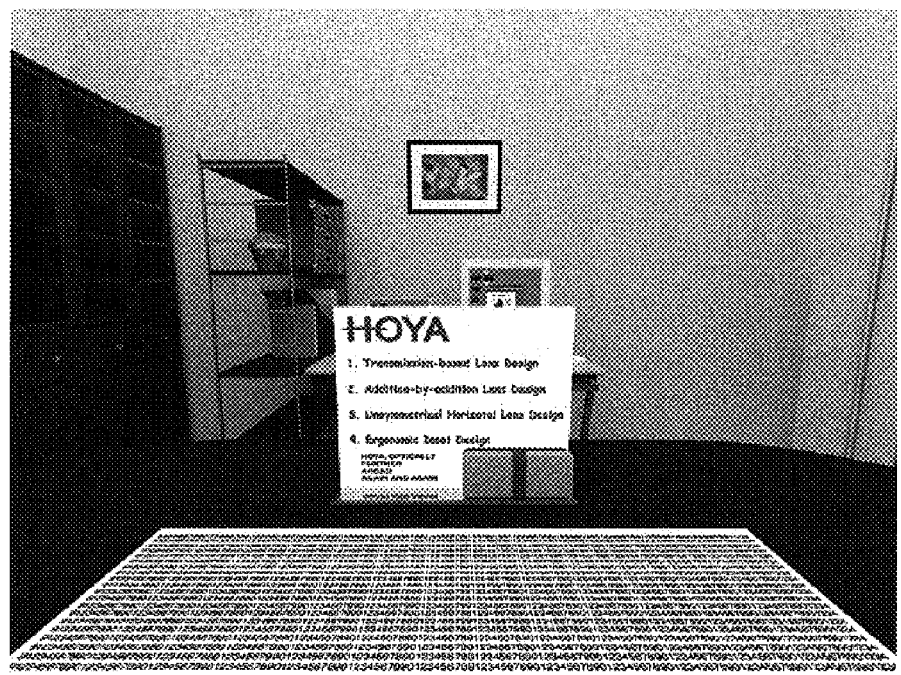
FIG. 13 is an original image of Embodiment 1 in accordance with the present invention.

FIGS. 13 to 19 show images of various binocular performance indexes obtained in Embodiment 1 in accordance with the present invention. Both spectacle lens are progressive addition lenses and have distant-vision power 0.00D with addition of 2.50D (HOYALUX SUMMIT, a trademark of HOYA Co. Ltd.). FIG. 13 shows an original image of Embodiment 1 which shows scenery in a room. The distance from the eyes to the wall is 2.5 m and the distance from the eyes to the whiteboard on the desk is about 80 cm. The visual field is 96° in the horizontal direction and 80° in the vertical direction.

Figure 14:
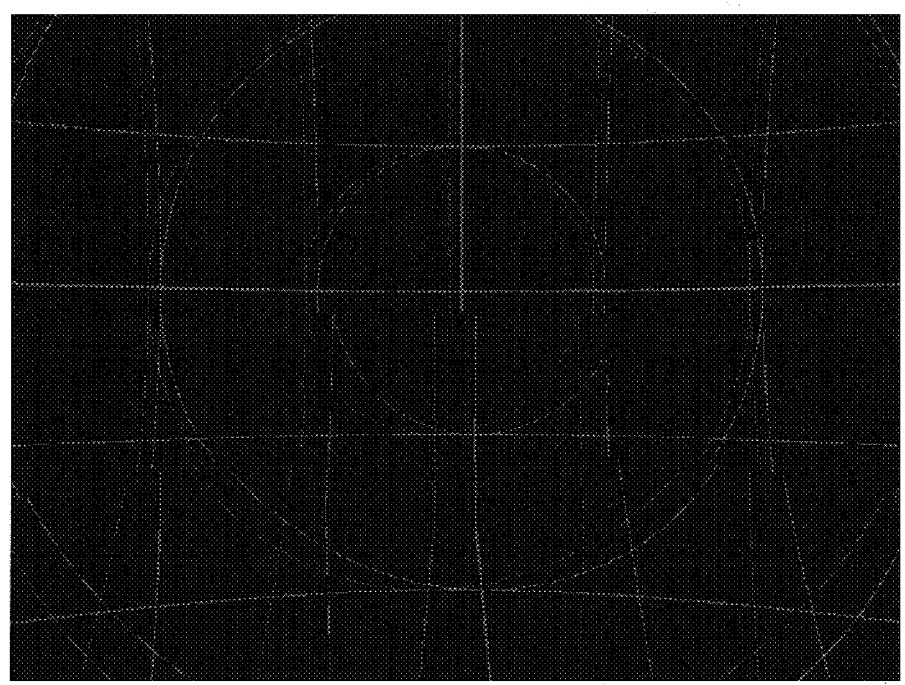
FIG. 14 is a map of the positions on the convex surface of a lens where the visual lines pass in Embodiment 1.
Figure 15:
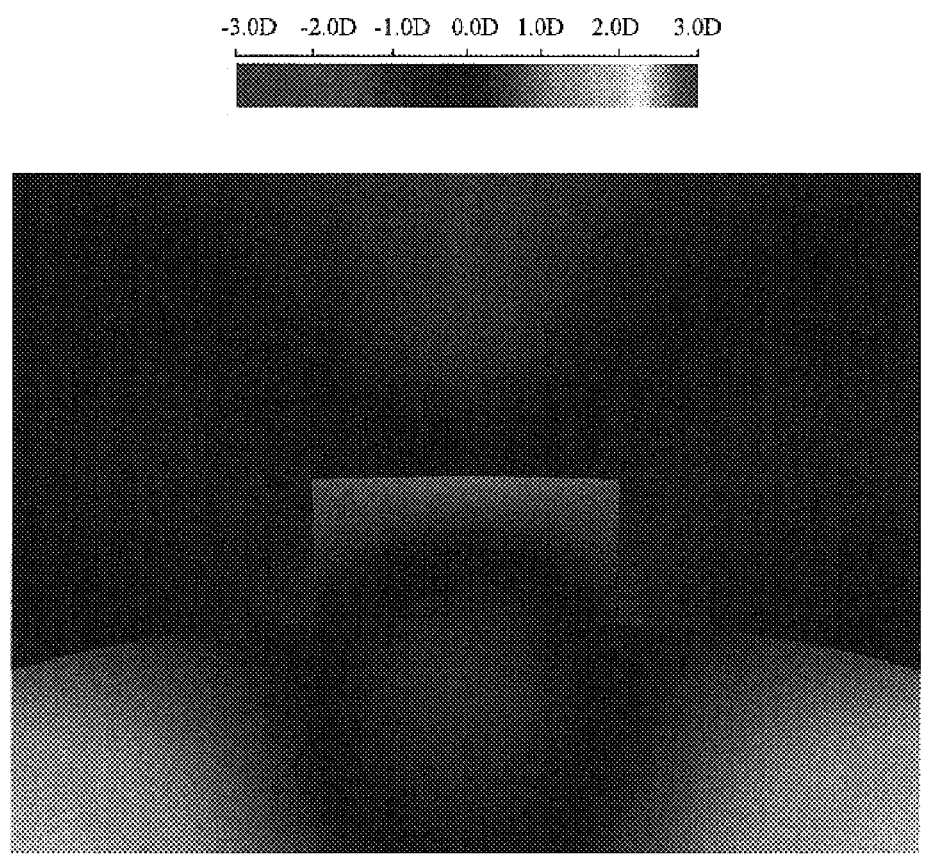
FIG. 15 shows an image of residual power of the average of the right and the left residual wavefront in Embodiment 1.
Figure 16:
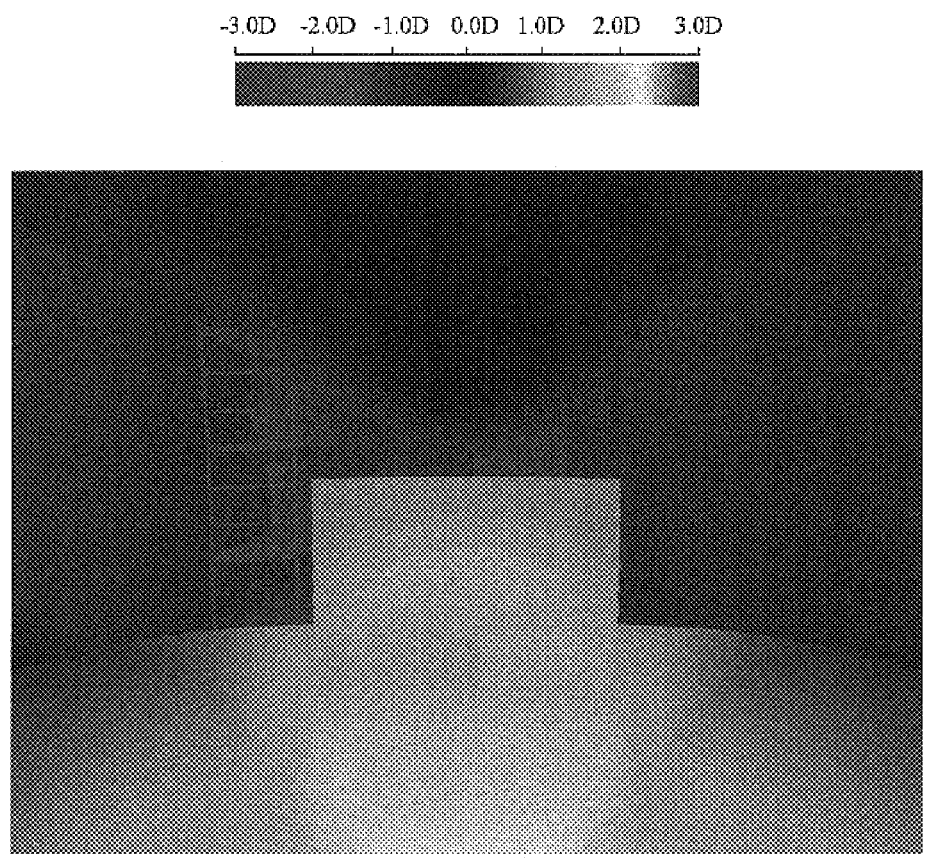
FIG. 16 shows an image of the convergence-accommodation difference in Embodiment 1.
Figure 17:
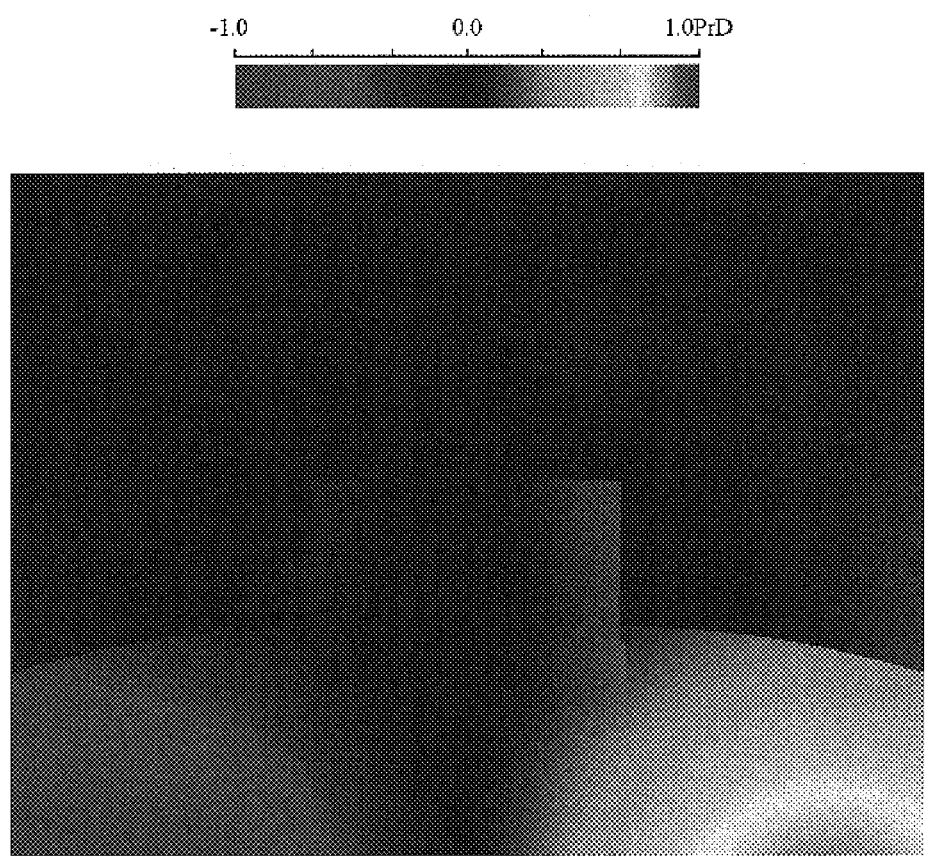
FIG. 17 shows an image of the binocular vertical deviation in Embodiment 1.
Figure 18:
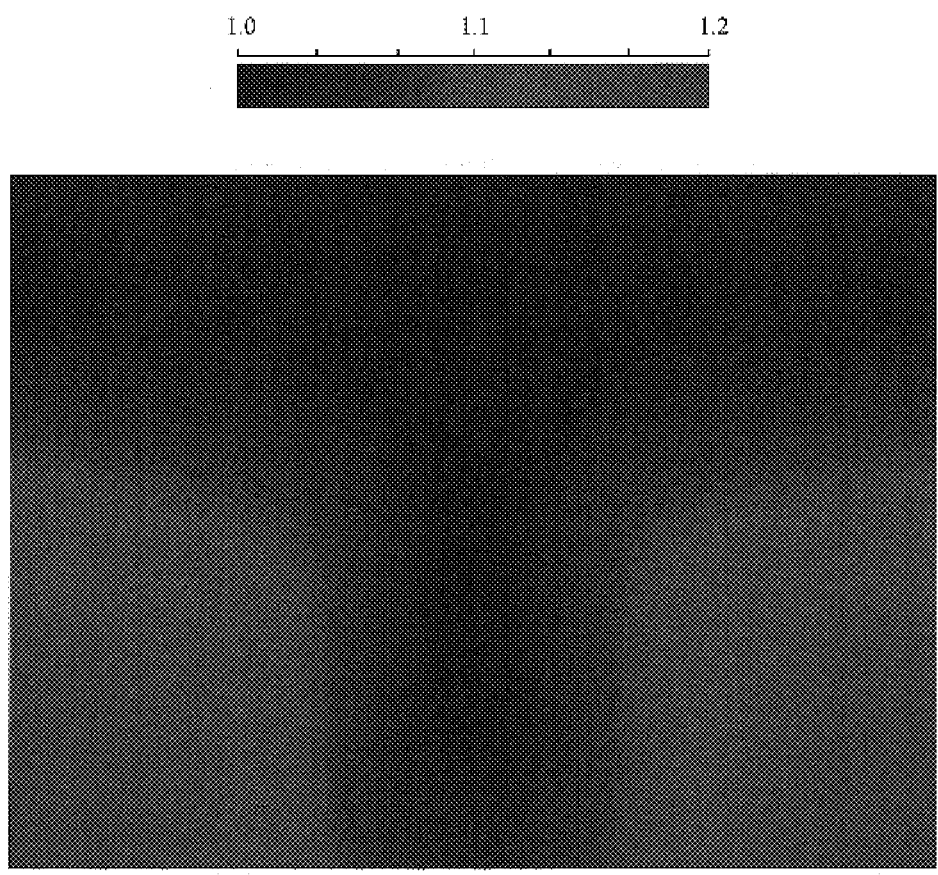
FIG. 18 shows an image of the binocular point deformation index in Embodiment 1.
Figure 19:
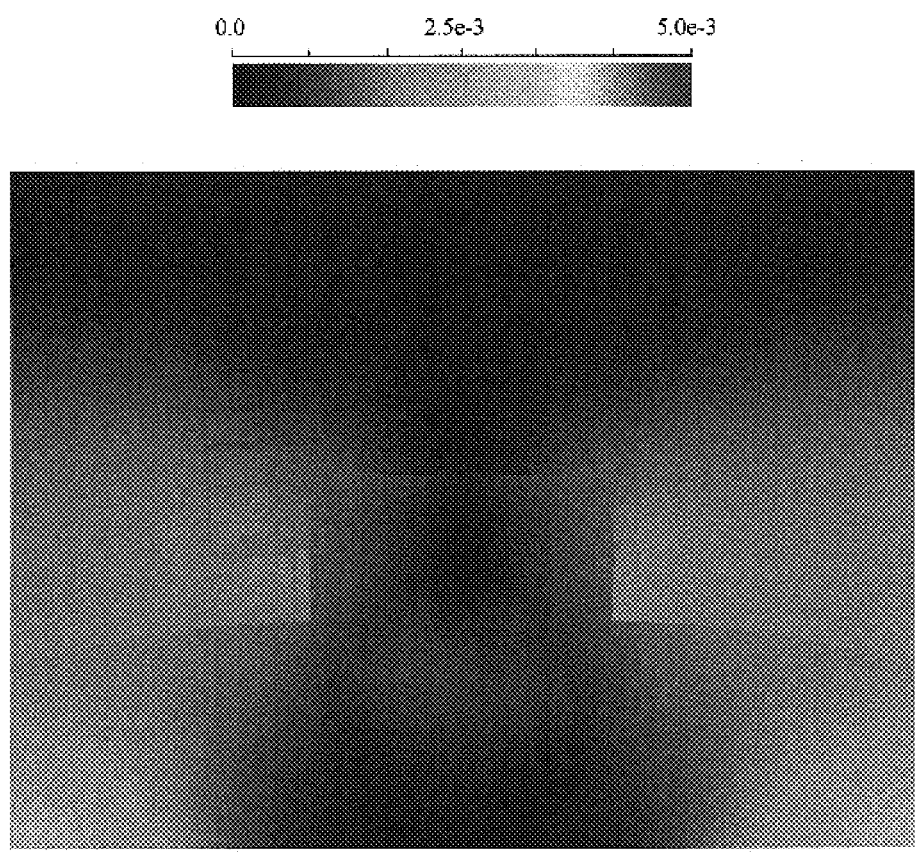
FIG. 19 shows an image of the binocular clearness index in Embodiment 1.

FIG. 14 is a map of the positions on the convex surface of a lens where the visual lines pass. The red lines are for the right lens and the blue lines are for the left lens. The pitch of the grid is 10 mm and the distance between diameters of concentric circles, each having its center at the geometric center of the lens, is also 10 mm. FIG. 15 shows the image of residual power of the average of the right and the left residual wavefront. FIG. 16 shows the image of the convergence-accommodation difference. FIG. 17 shows the image of the binocular vertical deviation. FIG. 18 shows the image of the binocular point deformation index. The binocular point deformation index is defined as the ratio of the major axis to the minor axis of the binocular deformation ellipse. FIG. 19 shows the image of the binocular clearness index. The clearness index is the size of the binocular PSF expressed by the tangent of the visual angle.

In accordance with the present embodiment, binocular performances of a spectacle lens in the situation of viewing an actual scene can be evaluated through viewing the various described images of the visual field.

B. Embodiment 2

Figure 20:
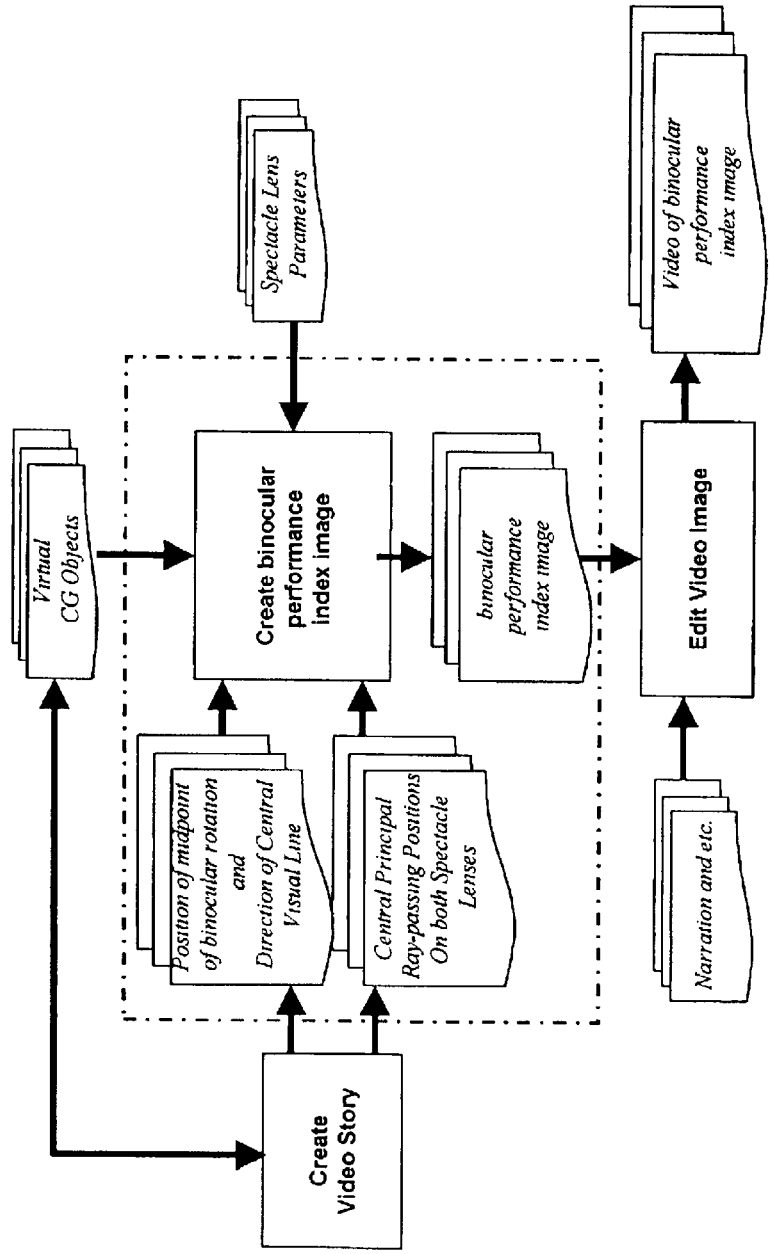
FIG. 20 is a flow diagram showing the overall flow of the steps for the method for creating a video image of the binocular performance index image according to the present invention.

The second embodiment comprises obtaining a video image by creating a large number of still images of the performance index distribution image in the first embodiment in a time-series manner by changing the position of the eye and the direction of the line of sight or "sight line." The present embodiment is basically the same as the first embodiment, except for the added steps of creating a movie story that includes, for example, the position of the eye, the direction of the sight line, and the motion and deformation of the virtual object point that change in a time-series manner. This embodiment also comprises editing the respective still images obtained in a time-series manner to create a motion picture image when creating a video of the original image. Thus, a detailed discussion of the overall flow shown in FIG. 20 is unnecessary and will be omitted. It is noted that a movie story at the lens passing point is required when creating the motion picture video image. Spline interpolation can be utilized for creating the story and allows a smooth motion of the visual line to be realized without the need to define the position of the eye, the direction of visual line, and the lens passing point at all points in time.

The second embodiment described above allows the motion video image to be obtained to reproduce the effect of changing the position of the eye, moving the visual line and changing the passing position of the visual line on the lens, which models or simulates the lens performance when seeing the outside world through a progressive addition lens, for example. Accordingly, it becomes possible to evaluate the image forming performance of the spectacle lens in a mode very close to actual use. Further, it becomes possible to evaluate the lens while confirming the movement of the visual line on the lens by indicating the lens frame mark on a video image indicating screen.

Figure 21:
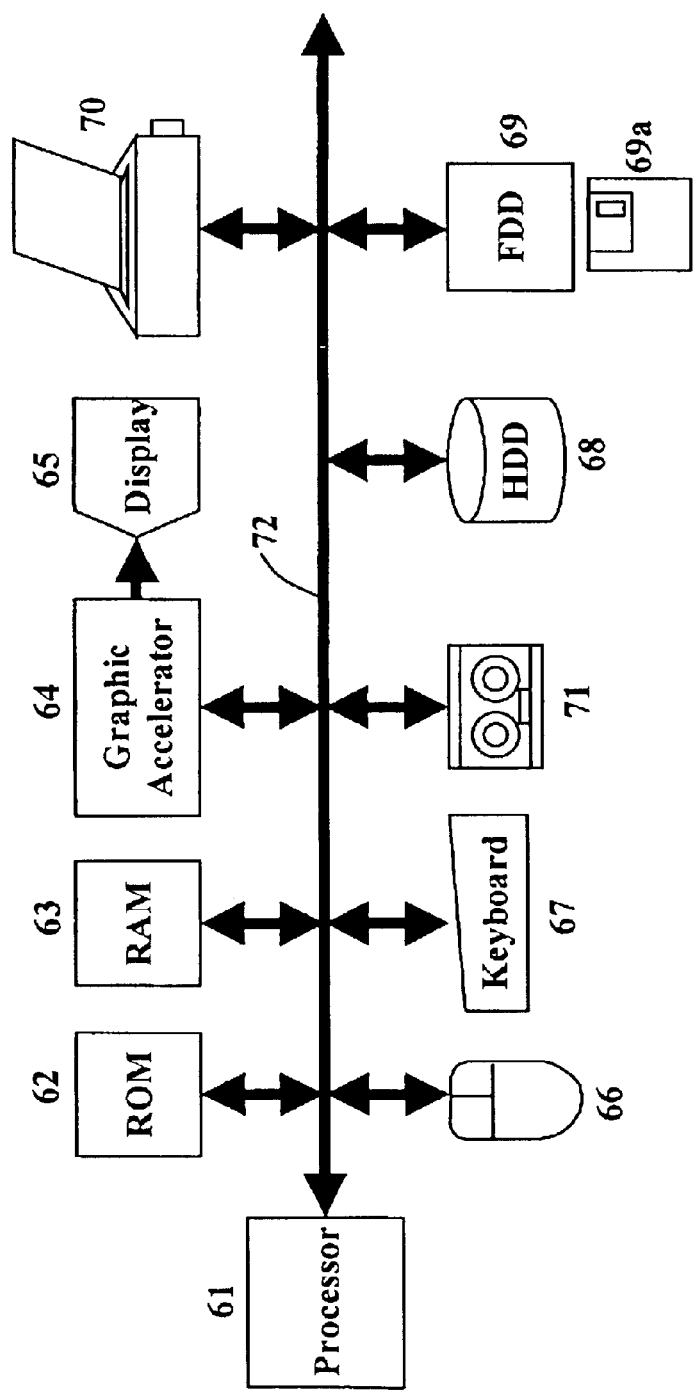
FIG. 21 is a block diagram showing the construction of the apparatus embodiment for deriving and displaying the binocular performance of spectacle lenses in accordance with the present invention.

Next, an apparatus embodiment in accordance with the present invention that performs the methods described in the above-mentioned embodiments will be briefly explained. FIG. 21 is a block diagram showing the schematic structure of the apparatus embodiment for performing the method embodiments of the present invention. As shown in FIG. 21, the apparatus comprises a processor 61, a read-only memory (ROM) 62, a main memory (RAM) 63, a graphic control circuit (also known as a "graphic accelerator") 64, a display 65, a mouse 66, a keyboard 67, a hard disk drive (HDD) 68, an external storage device (FDD) 69, a printer 70, a magnetic tape unit 71, and the like. These components are connected via a data bus 72.

The processor 61 generally controls the whole apparatus. Programs necessary in starting the apparatus are stored in the read-only memory 62. Programs for creating and displaying the performance index distribution image are stored in the main memory 63. The graphic control circuit 64 contains a video memory and converts image data obtained into display signals to display on the display 65. The mouse 66 is a pointing device for selecting various icons and menus on the display. A system program and programs for creating and displaying the performance index distribution image are stored in the hard disk drive 68 and are loaded to the main memory 63 after the apparatus is turned on. The hard disk drive 68 also temporarily stores data, such as the performance index distribution image.

The external storage 69 inputs required data, such as original image data, through an external storage media 69a or saves it to the external storage media 69a, such as a floppy disk, as necessary. The printer 70 is used in printing out the performance index distribution image and the like. The magnetic tape unit 71 is used in saving programs and data to a magnetic tape as necessary. It is noted that the apparatus having the basic structure described above may be constructed by using a high-performance personal computer or a conventional general-purpose computer.

As described in detail above, the method and apparatus embodiments for indicating the binocular performance of spectacle lenses according to the present invention are characterized in defining and finding the binocular performance index indicating the binocular performance of the spectacle lenses to all object points within a visual field when the outside world is observed through the spectacle lenses, and in indicating a value or scale of the performance index in a visually understandable display mode. Thereby, the present invention allows the binocular performance of the spectacle lens to be evaluated visually in a manner very close to its state of actual use.

While the present invention has been described with reference to certain preferred embodiments, one of ordinary skill in the art will recognize that additions, deletions, substitutions, modifications and improvements can be made while remaining within the spirit and scope of the present invention as defined by the appended claims.

What is claimed is:

1. A method for indicating binocular performance of spectacle lenses when a visual field is seen by an observer through right and left spectacle lenses comprising the steps of:
   defining a binocular performance index expressing a binocular performance of the spectacle lenses for viewing an object point in the visual field to obtain a binocular performance index definition;
   deriving a binocular performance index for each of a plurality of object points distributed over the visual field using the binocular performance index definition; and
   displaying a scale of the derived binocular performance indexes in a visually understandable mode.

2. A method for indicating binocular performance of spectacle lenses when a visual field is seen by an observer through right and left spectacle lenses comprising the steps of:
   defining a binocular performance index expressing a binocular performance of the spectacle lenses for viewing an object point in a visual field to obtain a binocular performance index definition;
   deriving a binocular performance index for all object points in the visual field using the binocular performance index definition, each object point having a binocular performance index and corresponding to a pixel of an image which covers the visual field; and
   creating a binocular performance index image covering the visual field, wherein a monochromatic or RGB color luminosity of each pixel is assigned to indicate a value of the binocular performance index for viewing the corresponding object point.

3. A method for indicating binocular performance of spectacle lenses according to claim 2, wherein said step of creating a binocular performance index image further comprises the steps of:
   creating an original image comprising placing a midpoint of binocular rotation at a specific position, the midpoint of binocular rotation being a midpoint between centers of monocular rotation of right and left eyes, and creating, as the original image, an image within the visual field defined as a specific pyramidal field having an apex at the midpoint of binocular rotation;
   creating a distorted original image by a ray tracing method, wherein the distorted original image is an image having distortion determined by observing a plurality of object points in the visual field through the spectacle lenses;
   deriving positions of spectacle frames by creating images of spectacle frame marks that indicate positions of right and left spectacle frames on the original image or on the distorted original image by using data of principal ray-passing positions obtained in the step of creating a distorted original image;
   deriving binocular performance indexes with respect to the plurality of object points, each object point corresponding to a pixel of the original image or the distorted original image created respectively in the step of creating the original image or creating the distorted original image, in an optical system comprising the spectacle lenses and an ocular model; and
   creating a binocular performance index image by assigning, to each pixel of the original image or the distorted original image, a monocular luminance or luminances of three primary colors of RGB determined in accordance with a value of the binocular performance index derived in the step of deriving a binocular performance index, and overlaying the binocular performance index image with a frame mark image of spectacle frames created in the step of deriving positions of spectacle frames.

4. A method for indicating binocular performance of spectacle lenses according to claim 2, wherein the step of creating a binocular performance index image further comprises the steps of:
   (a) creating an original image, further comprising the steps of:
      (i) creating virtual objects by using computer graphics and placing the virtual objects in a virtual three-dimensional space;
      (ii) placing a midpoint of binocular rotation at a specific position in the virtual three-dimensional space;
      (iii) creating an original image of the virtual objects within a visual field, the visual field defined as a pyramid having an apex located at the midpoint of binocular rotation and a central axis oriented along a direction of a specific central visual line; and
      (iv) deriving, with respect to a plurality of object points, wherein each object point corresponds to a pixel of the original image, an object distance, wherein object distance is defined as a distance between the object point and the midpoint of binocular rotation;
   (b) creating a distorted original image, further comprising steps of:
      (i) defining, for viewing an object point, a direction of synkinetic binocular rotation that is uniquely determined by both directions of monocular rotation of right and left eyeballs directed toward the object point;
      (ii) deriving a central direction of synkinetic binocular rotation with a ray tracing method so that each of right and left monocular central principal rays pass through a specific position on each spectacle lens, respectively, wherein the central direction of synkinetic binocular rotation is the direction of synkinetic binocular rotation for viewing the object point located at a center of the visual field and the right and the left monocular central principal rays are principal rays directed from right and left eyeballs, respectively, toward the central object point;
      (iii) deriving, with respect to each object point, a direction of synkinetic binocular rotation for viewing the object point as the position of the object point in an after-lens visual field with a ray tracing method, wherein the after-lens visual field is a visual field with a central axis oriented along the central direction of synkinetic binocular rotation;
      (iv) creating the distorted original image, the distorted original image being defined as an image obtained in the after-lens visual field and having distortion caused by the spectacle lenses; and
      (v) deriving, with respect to each object point, both right and left principal ray-passing positions, wherein a principal ray-passing position is a position on the spectacle lens through which a principal ray directed toward the object point passes;
   (c) deriving positions of spectacle frames by creating images of spectacle frame marks that indicate positions of right and left spectacle frames on the original image or on the distorted original image by using data of the principal ray-passing positions obtained in the step of creating a distorted original image;

(d) deriving the binocular performance index, further comprising the steps of:
(i) providing an accommodation-dependent ocular optical system for each of the right and left eyes as a model of the ocular optical system;
(ii) calculating, with respect to each object point corresponding to a pixel of the original image or the distorted original image, distances from the object point to the right and left centers of monocular rotation using the object distance obtained in the step of creating an original image;
(iii) setting, with respect to each object point corresponding to a pixel of the original image or the distorted original image, powers of accommodation of right and left eyes to a same value or different values in accordance with each distance from the object point to each center of monocular rotation, and each refractive power of spectacle lens at each principal ray-passing position determined in the step of creating a distorted original image; and
(iv) deriving, with respect to each object point corresponding to a pixel of the original image or the distorted original image, the binocular performance index of spectacle lenses in a combined optical system comprising the spectacle lens and the accommodation-dependent ocular optical system which is rotated in accordance with a direction of monocular rotation; and (e) creating the binocular performance index image, further comprising the steps of:
(i) creating a binocular performance index image by assigning, to each pixel of the original image or the distorted original image, a monocular luminance or a set of luminances of three primary colors of RGB determined in accordance with the value of the binocular performance index of spectacle lenses, and
(ii) overlaying the binocular performance index image with the frame mark images of spectacle frames created in the step of deriving positions of spectacle frames.

5. A method for indicating binocular performance of spectacle lenses when an observer sees through right and left spectacle lenses comprising the steps of:
creating virtual objects by using computer graphics and placing the virtual objects in a virtual three-dimensional space;
creating a story of changes with time by using positions of the observer's eyes, a direction of a central visual line, ray-passing positions in the right and the left lenses and an amount of deformation and displacement of the virtual objects;
creating a binocular performance index image of spectacle lenses at each point of time, wherein, the following steps are performed for each point of time:
(a) defining a binocular performance index expressing a binocular performance of the spectacle lenses for viewing an object point in a visual field to obtain a binocular performance index definition;
(b) deriving a binocular performance index for all object points in the visual held using the binocular performance index definition, each object point having a binocular performance index and corresponding to a pixel of an image which covers the visual field; and
(c) creating a binocular performance index image covering the visual field, wherein a monochromatic or RGB color luminosity of each pixel is assigned to indicate a value of the binocular performance index for viewing the corresponding object point; and
editing binocular performance index images at all points of time to create a video movie.

6. A method for indicating binocular performance of spectacle lenses according to any one of claims 1–5, wherein said binocular performance index is defined as a binocular residual corrective error for viewing said object point.

7. A method for indicating binocular performance of spectacle lenses according to claim 6, wherein said binocular residual corrective error is defined as a residual power or a residual astigmatism derived from a right or a left residual wavefront.

8. A method for indicating binocular performance of spectacle lenses according to claim 6, wherein said binocular residual corrective error is defined as a residual power or a residual astigmatism derived from an wavefront defined as an average of, or the difference between, a right and a left residual wavefront.

9. A method for indicating binocular performance of spectacle lenses according to any one of claims 1–5, wherein the binocular performance index is defined as a binocular vertical deviation, which is a vertical deviation between right and left visual lines, that is derived from directions of right and left monocular rotations for viewing said object point.

10. A method for indicating binocular performance of spectacle lenses according to any one of claims 1–5, wherein the binocular performance index is defined as a degree of disagreement between a convergence and an accommodation for viewing said object point.

11. A method for indicating binocular performance of spectacle lenses according to claim 10, wherein the degree of disagreement is defined as the difference between a power of convergence and a power of accommodation.

12. A method for indicating binocular performance of spectacle lenses according to any one of claims 1–5, wherein the binocular performance index is defined as a binocular point deformation index expressing a degree of deformation for viewing said object point.

13. A method for indicating binocular performance of spectacle lenses according to claim 12, wherein the binocular point deformation index is derived by determining deforming changes in the shape of a small circle centered at said object point when binocularly viewed through the spectacle lenses, wherein the deformed shape of the small circle is approximated to be an ellipse.

14. A method for indicating binocular performance of spectacle lenses according to claim 13, wherein the binocular point deformation index is defined as a ratio of major axis to minor axis of said ellipse.

15. A method for indicating binocular performance of spectacle lenses according to any one of claims 1–5, wherein the binocular performance index is defined as an aniseikonic index expressing a degree of optical aniseikonia for viewing said object point.

16. A method for indicating binocular performance of spectacle lenses according to claim 15, wherein the aniseikonic index is derived by determining deforming changes in the shape of a small circle centered at said object point changes when viewed through the right spectacle lens and the left spectacle lens, each deformed shape of the small circle corresponding to viewing through the right spectacle lens and the left spectacle lens, respectively, is approximated to be an ellipse.

17. A method for indicating binocular performance of spectacle lenses according to claim 16, wherein the aniseikonic index is defined as the square root of a ratio of the area of a right point deformed ellipse to the area of a left point deformed ellipse.

18. A method for indicating binocular performance of spectacle lenses according to any one of claims 1–5, wherein the binocular performance index is defined as a binocular clearness index which expresses a degree of clearness for viewing said object point binocularly.

19. A method for indicating binocular performance of spectacle lenses according to claim 18, wherein the binocular clearness index is derived by determining monocular point spread functions (PSF) for each of the right eye and the left eye for viewing said object point, approximating a spreading range of the right and the left monocular point spread functions to an ellipse, combining both right and left spreading ellipses into a binocular spreading ellipse, and defining the binocular clearness index as half of a diagonal length of a rectangle that circumscribes the binocular spreading ellipse.

20. An apparatus for indicating binocular performance of spectacle lenses when an observer sees through right and left spectacle lenses, the apparatus comprising:
 (a) means for creating an original image, further comprising:
  (i) means for creating virtual objects by using computer graphics and placing the virtual objects in a virtual three-dimensional space;
  (ii) means for placing a midpoint of binocular rotation at a specific position in the virtual three-dimensional space;
  (iii) means for creating an original image of the virtual objects within a visual field, the visual field defined as a pyramid having an apex located at the midpoint of binocular rotation and a central axis oriented along a direction of a specific central visual line; and
  (iv) means for deriving, with respect to a plurality of object points, each object point corresponding to a pixel of the original image, an object distance, wherein the object distance is defined as a distance between the object point and the midpoint of binocular rotation;
 (b) means for creating a distorted original image, further comprising:
  (i) means for defining a direction of synkinetic binocular rotation for viewing an object point, wherein the synkinetic binocular rotation is uniquely determined by both directions of monocular rotation for right and left eyeballs directed toward the object point;
  (ii) means for deriving a central direction of synkinetic binocular rotation with a ray tracing method so that each of right and left monocular central principal rays pass through a specific position on each spectacle lens, respectively, wherein the central direction of synkinetic binocular rotation is the direction of synkinetic binocular rotation for viewing the object point located at a center of the visual field and the right and left monocular central principal rays are principal rays directed from the right and left eyeballs, respectively, toward the central object point;
  (iii) means for deriving, with respect to each object point, a direction of synkinetic binocular rotation for viewing the object point as a position of the object point in an after-lens visual field with a ray tracing method, wherein the after-lens visual field is a visual field that has a central axis oriented along the central direction of synkinetic binocular rotation;
  (iv) means for creating a distorted original image, the distorted original image being defined as an image obtained in the after-lens visual field and having distortion caused by the spectacle lenses; and
  (v) means for deriving, with respect to each object point, both right and left principal ray-passing positions, wherein each principal ray-passing position is a position on the respective spectacle lens through which a principal ray directed toward the object point passes;
 (c) means for deriving positions of spectacle frames by creating images of spectacle frame marks that indicate positions of right and left spectacle frames on the original image, or on the distorted original image, by using data of the principal ray-passing positions determined when creating a distorted original image;
 (d) means for deriving a binocular performance index, further comprising:
  (i) means for providing an accommodation-dependent ocular optical system for each of the right and left eyes as a model of the ocular optical system;
  (ii) means for calculating, with respect to each object point corresponding to a pixel of the original image or the distorted original image, distances from the object point to the right and left centers of monocular rotation using the object distance obtained when creating an original image;
  (iii) means for setting, with respect to each object point corresponding to a pixel of the original image or the distorted original image, powers of accommodation of right and left eyes to a same value or to different values in accordance with each distance from the object point to each center of monocular rotation, and each refractive power of spectacle lens at each principal ray-passing position determined when creating a distorted original image; and
  (iv) means for deriving, with respect to each object point corresponding to a pixel of the original image or the distorted original image, a binocular performance index of spectacle lenses in a combined optical system comprising the spectacle lens and the accommodation-dependent ocular optical system which is rotated in accordance with a direction of monocular rotation; and
 (e) means for creating a binocular performance index image, further comprising:
  (i) means for creating the binocular performance index image by assigning, to each pixel of the original image or the distorted original image, a monocular luminance or luminances of three primary colors of RGB determined in accordance with a value of the binocular performance index of spectacle lenses, and
  (ii) means for overlaying the binocular performance index image with the frame mark images of spectacle frames created when deriving positions of spectacle frames.

21. An apparatus for indicating binocular performance of spectacle lenses when an observer sees through right and left spectacle lenses, comprising:
 means for creating virtual objects by using computer graphics and placing the virtual objects in a virtual three-dimensional space;
 means for creating a story of changes with time using positions of the observer's eyes, a direction of a central visual line, ray-passing positions for the right and left lenses, respectively, and an amount of deformation and displacement of the virtual objects;

means for creating a binocular performance index image of spectacle lenses at each point of time; and means for editing binocular performance index images at all points of time to create a video movie.

22. An apparatus for indicating binocular performance of spectacle lenses when an observer sees through right and left spectacle lenses according to claim 21, wherein said means for creating a binocular performance index image of spectacle lenses at each point of time comprises:

means for defining a binocular performance index expressing a binocular performance of the spectacle lenses for viewing an object point in the visual field to obtain a binocular performance index definition;

means for deriving a binocular performance index for each of a plurality of object points distributed over the visual field using the binocular performance index definition; and means for displaying a scale of the derived binocular performance indexes in a visually understandable mode.

* * * * *